US011683684B2

(12) United States Patent
Lund et al.

(10) Patent No.: US 11,683,684 B2
(45) Date of Patent: Jun. 20, 2023

(54) OBTAINING A CREDENTIAL FOR V2X TRANSMISSION ON BEHALF OF A VEHICLE

(71) Applicant: QUALCOMM Incorporated, San Diego, CA (US)

(72) Inventors: Benjamin Lund, Escondido, CA (US); Soumya Das, San Diego, CA (US); Edwin Chongwoo Park, San Diego, CA (US); Garrett Shriver, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/936,428

(22) Filed: Jul. 23, 2020

(65) Prior Publication Data

US 2022/0030430 A1   Jan. 27, 2022

(51) Int. Cl.
*G06F 21/34* (2013.01)
*H04W 12/06* (2021.01)
(Continued)

(52) U.S. Cl.
CPC ........... *H04W 12/068* (2021.01); *H04W 4/40* (2018.02); *H04W 8/24* (2013.01); *H04W 12/033* (2021.01);
(Continued)

(58) Field of Classification Search
CPC ... H04W 12/068; H04W 4/40; H04W 12/106; H04W 12/041; H04W 12/033; H04W 8/24
(Continued)

(56) References Cited

U.S. PATENT DOCUMENTS 9,397,838 B1 *   7/2016   Chen ...................... H04L 9/321
9,397,980 B1 *   7/2016   Chen ...................... G06F 21/33
(Continued)

FOREIGN PATENT DOCUMENTS

CN          109495498 A    *   3/2019

OTHER PUBLICATIONS

U.S. Appl. No. 16/936,423, filed Jul. 23, 2020, Lund et al.
(Continued)

*Primary Examiner* — Haresh N Patel
(74) *Attorney, Agent, or Firm* — Campbell Chiang; Weaver Austin Villeneuve & Sampson LLP

(57) ABSTRACT

Techniques described herein include utilizing a mobile device as a proxy receiver and/or transmitter for a vehicle in a V2X network. In some embodiments, the mobile device associated mobile device capabilities may be configured to obtain vehicle capabilities and store such data in memory at the mobile device. The mobile device may obtain any suitable combination of a reception credential and one or more transmission credentials. In some embodiments, the one or more transmission credentials may be generated by a credential authority based at least in part on determining that the vehicle capabilities and mobile device capabilities indicate that the sensor(s) and/or processing resources of the vehicle and/or mobile device meet transmission requirement thresholds for the network. The mobile device may subsequently transmit any suitable data message on behalf of the vehicle using at least one of the transmission credentials.

26 Claims, 13 Drawing Sheets

(51) Int. Cl.
  *H04W 12/08* (2021.01)
  *H04W 4/40* (2018.01)
  *H04W 12/106* (2021.01)
  *H04W 12/041* (2021.01)
  *H04W 12/033* (2021.01)
  *H04W 8/24* (2009.01)

(52) U.S. Cl.
  CPC ....... *H04W 12/041* (2021.01); *H04W 12/106* (2021.01)

(58) Field of Classification Search
  USPC .......................................................... 726/2
  See application file for complete search history.

(56) References Cited

U.S. PATENT DOCUMENTS

| | | | |
|---|---|---|---|
| 9,488,980 | B2 | 11/2016 | Haberl et al. |
| 9,544,001 | B1 | 1/2017 | Aldereguia et al. |
| 9,680,784 | B2 | 6/2017 | Basson et al. |
| 9,826,500 | B1 | 11/2017 | Boss et al. |
| 10,163,276 | B2 | 12/2018 | Kim et al. |
| 10,168,683 | B2 | 1/2019 | Brew et al. |
| 10,235,882 | B1 | 3/2019 | Aoude et al. |
| 10,257,340 | B2 | 4/2019 | Adderly et al. |
| 10,282,165 | B2 | 5/2019 | Bostick et al. |
| 10,325,596 | B1* | 6/2019 | Tran .......................... G10L 15/30 |
| 10,332,124 | B2 | 6/2019 | Avary et al. |
| 10,423,292 | B2 | 9/2019 | Chan et al. |
| 10,449,967 | B1 | 10/2019 | Ferguson |
| 10,462,225 | B2 | 10/2019 | Chen et al. |
| 10,469,429 | B2 | 11/2019 | Hardee et al. |
| 10,530,719 | B2 | 1/2020 | Anders et al. |
| 10,558,794 | B2* | 2/2020 | Myers .................. H04L 63/0884 |
| 10,679,446 | B2* | 6/2020 | Santhosh ................ G06F 21/45 |
| 10,743,176 | B1* | 8/2020 | Khan .................... H04W 12/48 |
| 10,750,005 | B2 | 8/2020 | Keen et al. |
| 10,850,746 | B2 | 12/2020 | Marti et al. |
| 10,893,010 | B1 | 1/2021 | Argenti et al. |
| 11,165,591 | B2* | 11/2021 | Thakore .............. H04L 63/0823 |
| 11,348,387 | B2* | 5/2022 | Peng .................. H04W 12/0471 |
| 2005/0197775 | A1 | 9/2005 | Smith |
| 2009/0222902 | A1* | 9/2009 | Bender ................... G06F 21/33 726/10 |
| 2010/0031025 | A1* | 2/2010 | Zhang ................. H04L 63/0823 713/156 |
| 2011/0098911 | A1 | 4/2011 | Ellanti |
| 2011/0141989 | A1* | 6/2011 | Kondo .................. H04L 1/1854 370/329 |
| 2013/0166907 | A1* | 6/2013 | Brown .................. H04L 9/3268 713/156 |
| 2015/0046022 | A1 | 2/2015 | Bai et al. |
| 2015/0081202 | A1 | 3/2015 | Levin |
| 2015/0134428 | A1 | 5/2015 | Li et al. |
| 2015/0244707 | A1* | 8/2015 | Bowen ...................... H04L 9/30 713/158 |
| 2015/0266377 | A1 | 9/2015 | Hampiholi et al. |
| 2015/0282083 | A1* | 10/2015 | Jeong .................... H04W 76/28 370/311 |
| 2016/0080944 | A1* | 3/2016 | Colegate ................. H04L 63/06 455/410 |
| 2016/0088052 | A1 | 3/2016 | Juzswik et al. |
| 2016/0119151 | A1* | 4/2016 | Park ...................... H04L 9/007 713/158 |
| 2017/0032402 | A1 | 2/2017 | Patsiokas et al. |
| 2017/0270509 | A1* | 9/2017 | Colegate ................. G06F 21/73 |
| 2017/0279784 | A1* | 9/2017 | Kent ..................... H04L 9/3265 |
| 2018/0049274 | A1 | 2/2018 | Kim et al. |
| 2018/0059669 | A1* | 3/2018 | Madigan ................. H04W 4/38 |
| 2018/0213376 | A1 | 7/2018 | Pinheiro et al. |
| 2018/0295518 | A1* | 10/2018 | Alloche ................ H04L 9/3268 |
| 2019/0005726 | A1 | 1/2019 | Nakano et al. |
| 2019/0012912 | A1 | 1/2019 | Kim et al. |
| 2019/0096243 | A1 | 3/2019 | Doig et al. |
| 2019/0132932 | A1* | 5/2019 | Klecha .................... H04W 4/33 |
| 2019/0200228 | A1 | 6/2019 | Adrangi et al. |
| 2019/0245703 | A1 | 8/2019 | Simplicio Junior, Jr. et al. |
| 2019/0279440 | A1 | 9/2019 | Ricci |
| 2019/0294966 | A1 | 9/2019 | Khan et al. |
| 2019/0340448 | A1 | 11/2019 | Hayashi et al. |
| 2020/0017108 | A1 | 1/2020 | Bae et al. |
| 2020/0177398 | A1* | 6/2020 | Takemori ........... H04L 63/0823 |
| 2020/0234574 | A1 | 7/2020 | Park et al. |
| 2020/0267739 | A1* | 8/2020 | Nguyen ................ H04W 28/26 |
| 2020/0358764 | A1* | 11/2020 | Hojilla Uy ........... H04L 9/0866 |
| 2020/0365029 | A1 | 11/2020 | Kourous-Harrigan et al. |
| 2020/0389455 | A1* | 12/2020 | Fang ...................... G06F 21/44 |
| 2021/0014655 | A1* | 1/2021 | Stählin ................... H04W 4/40 |
| 2021/0112386 | A1 | 4/2021 | Lee |
| 2021/0142672 | A1 | 5/2021 | Tsai |
| 2021/0152991 | A1 | 5/2021 | Wu et al. |
| 2021/0168609 | A1* | 6/2021 | Nishimura ............... H04W 4/46 |
| 2021/0266867 | A1 | 8/2021 | Das et al. |
| 2021/0331692 | A1 | 10/2021 | Park et al. |
| 2022/0022013 | A1 | 1/2022 | Balasubramanian et al. |
| 2022/0375343 | A1 | 11/2022 | Lund |
| 2022/0394784 | A1 | 12/2022 | Hwang et al. |

OTHER PUBLICATIONS

U.S. Appl. No. 16/936,425, filed Jul. 23, 2020, Lund et al.
International Search Report and Written Opinion—PCT/US2021/038746—ISA/EPO—dated Sep. 29, 2021.

* cited by examiner

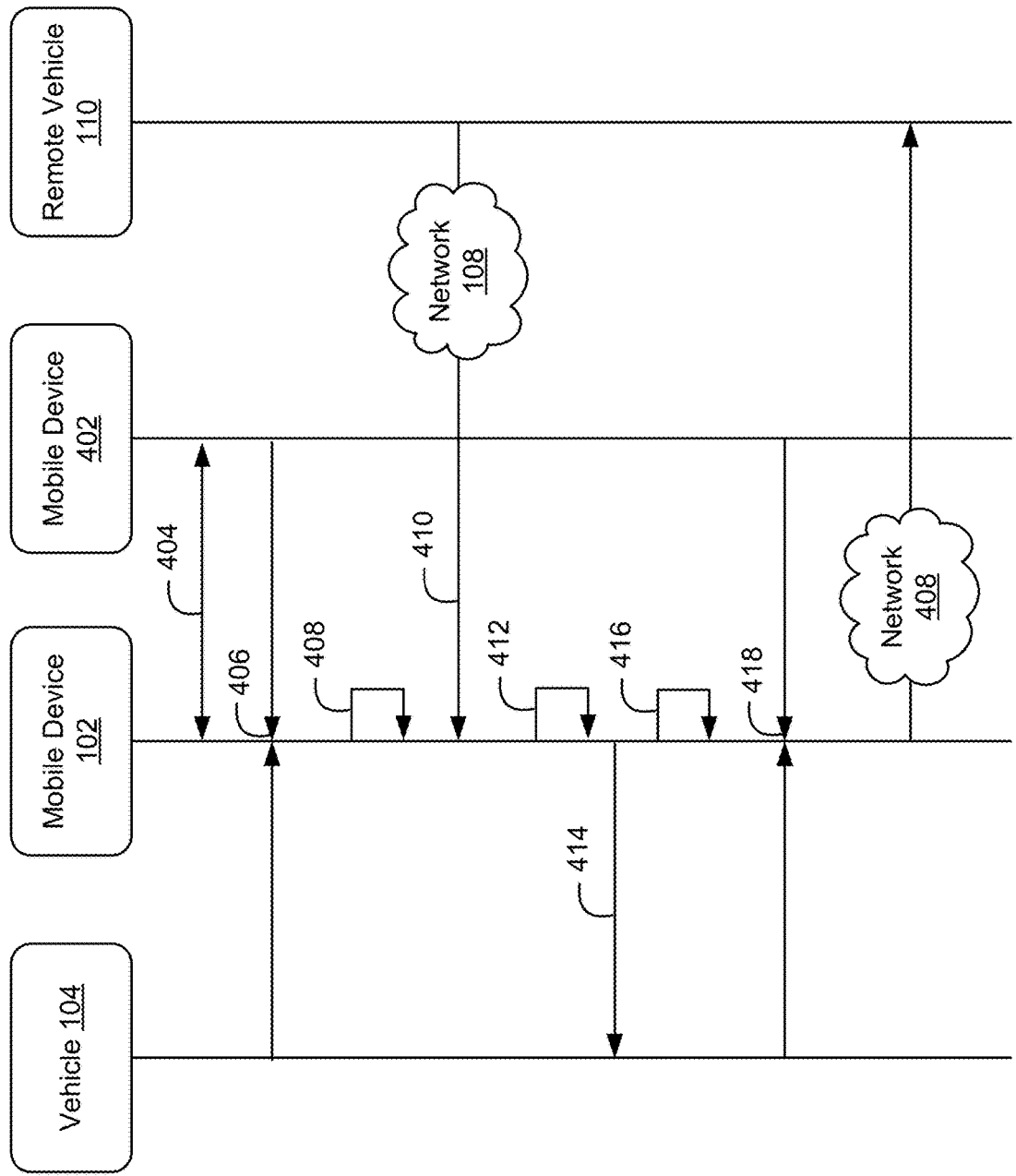

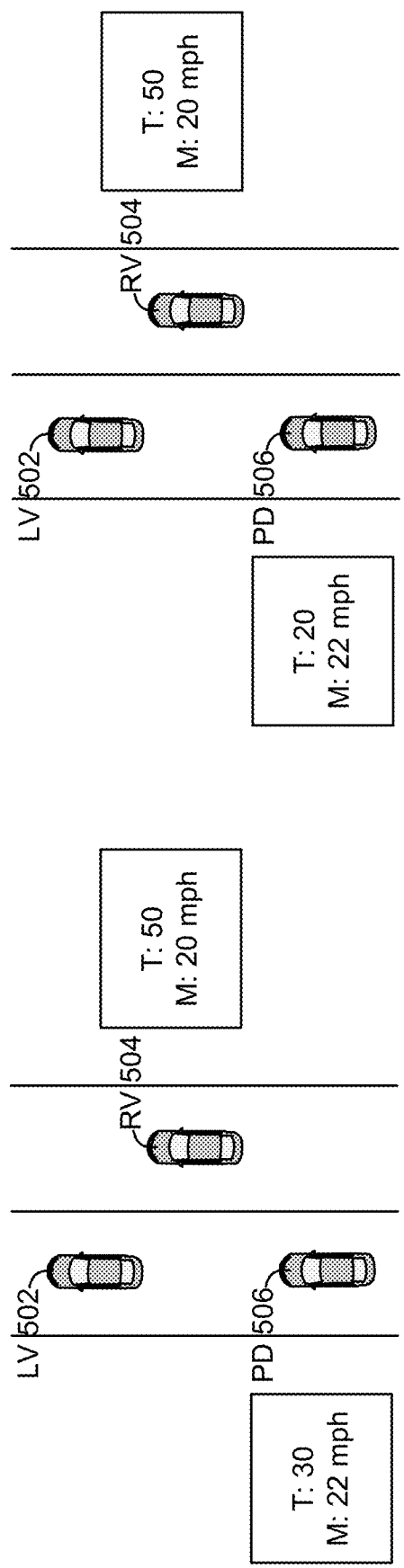
FIG. 5A
FIG. 5B
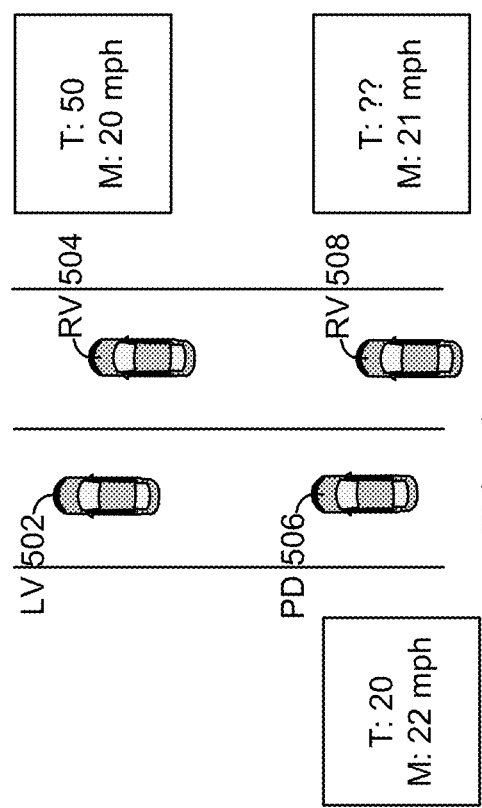
FIG. 5C

OBTAINING A CREDENTIAL FOR V2X TRANSMISSION ON BEHALF OF A VEHICLE

BACKGROUND

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V21) communication between the vehicle and infrastructure-based devices (commonly-termed road side units (RSUs)), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE).

Autonomous and semi-autonomous vehicles, including vehicles with Advanced Driver-Assistance Systems (ADAS), can communicate and coordinate maneuvers using V2X. To help V2X-capable vehicles ("V2X vehicles") maneuver safely on the road, V2X vehicles can communicate intended maneuvers to other V2X vehicles. This can include maneuvers such as a lane change, intersection crossing, and the like, along with the corresponding time window for the behavior trajectory.

Legacy vehicles, which are not configured with ADAS, may not take advantage of the valuable data being communicated, or their involvement may be suboptimal. Many benefits of a vehicle-to-everything (V2X) environment depend on knowing the accurate inter-vehicle distances and relative locations as well as on having environmental and situational awareness. However, Legacy vehicles are incapable of transmitting such information. Both legacy vehicle drivers and autonomous (or semi-autonomous) vehicle drivers can benefit from these types of shared interactions and communications.

BRIEF SUMMARY

Techniques described herein provide for transmitting data by a mobile device on behalf of a vehicle.

Some embodiments may include a method for transmitting data by a mobile device on behalf of a vehicle. The method may comprise obtaining, by the mobile device, vehicle capabilities associated with the vehicle, the vehicle capabilities indicating one or more sensors of the vehicle. The method may further comprise determining, by the mobile device, mobile device capabilities indicating one or more sensors, processing resources, or both of the mobile device. The method may further comprise obtaining, by the mobile device from a credential authority, one or more transmission credentials for vehicle-to-everything transmissions based at least in part on the vehicle capabilities and the mobile device capabilities. The method may further comprise, in response to obtaining the one or more transmission credentials for vehicle-to-everything transmissions, transmitting, by the mobile device via one or more transceivers, one or more data messages on behalf of the vehicle utilizing the one or more transmission credentials.

Some embodiments may include a mobile device. The mobile device may comprise a memory storing executable instructions for transmitting data by a mobile device on behalf of a vehicle and one or more processors communicatively coupled with the memory. In some embodiments, the one or more processors are configured to execute the instructions to cause the mobile device to perform operations. The operations may comprise obtaining, by the mobile device, vehicle capabilities associated with the vehicle, the vehicle capabilities indicating one or more sensors of the vehicle. The operations may further comprise determining, by the mobile device, mobile device capabilities indicating one or more sensors, processing resources, or both of the mobile device. The operations may further comprise obtaining, by the mobile device from a credential authority, one or more transmission credentials for vehicle-to-everything transmissions based at least in part on the vehicle capabilities and the mobile device capabilities. The operations may further comprise, in response to obtaining the one or more transmission credentials for vehicle-to-everything transmissions, transmitting, by the mobile device via one or more transceivers, one or more data messages on behalf of the vehicle utilizing the one or more transmission credentials.

Some embodiments may comprise a non-transitory computer-readable medium. The non-transitory computer-readable medium may comprise stored instructions for transmitting data by a mobile device on behalf of a vehicle. In some embodiments, the instructions, when executed by one or more processors of the mobile device, cause the one or more processors to perform operations. The operations may comprise obtaining, by the mobile device, vehicle capabilities associated with the vehicle, the vehicle capabilities indicating one or more sensors of the vehicle. The operations may further comprise determining, by the mobile device, mobile device capabilities indicating one or more sensors, processing resources, or both of the mobile device. The operations may further comprise obtaining, by the mobile device from a credential authority, one or more transmission credentials for vehicle-to-everything transmissions based at least in part on the vehicle capabilities and the mobile device capabilities. The operations may further comprise, in response to obtaining the one or more transmission credentials for vehicle-to-everything transmissions, transmitting, by the mobile device via one or more transceivers, one or more data messages on behalf of the vehicle utilizing the one or more transmission credentials.

Some embodiments may comprise a mobile device that transmits data by a mobile device on behalf of a vehicle. In some embodiments, the mobile device comprises means for obtaining, by the mobile device, vehicle capabilities associated with the vehicle, the vehicle capabilities indicating one or more sensors of the vehicle. The mobile device may further comprise means for determining mobile device capabilities indicating one or more sensors, processing resources, or both of the mobile device. The mobile device may further comprise means for obtaining, from a credential authority, one or more transmission credentials for vehicle-to-everything transmissions based at least in part on the vehicle capabilities and the mobile device capabilities. The mobile device may further comprise means for transmitting, via one or more transceivers, in response to obtaining the one or more transmission credentials, one or more data messages to at least one other vehicle on behalf of the vehicle utilizing the one or more transmission credentials.

BRIEF DESCRIPTION OF THE DRAWINGS

FIG. 4 is a flowchart depicting a method for utilizing a plurality of mobile devices to determine V2X transmission data, according to an embodiment.

FIGS. 5A-5C illustrate techniques for assigning a trust value to one or more entities of a V2X environment, according to an embodiment.

Figure 1:
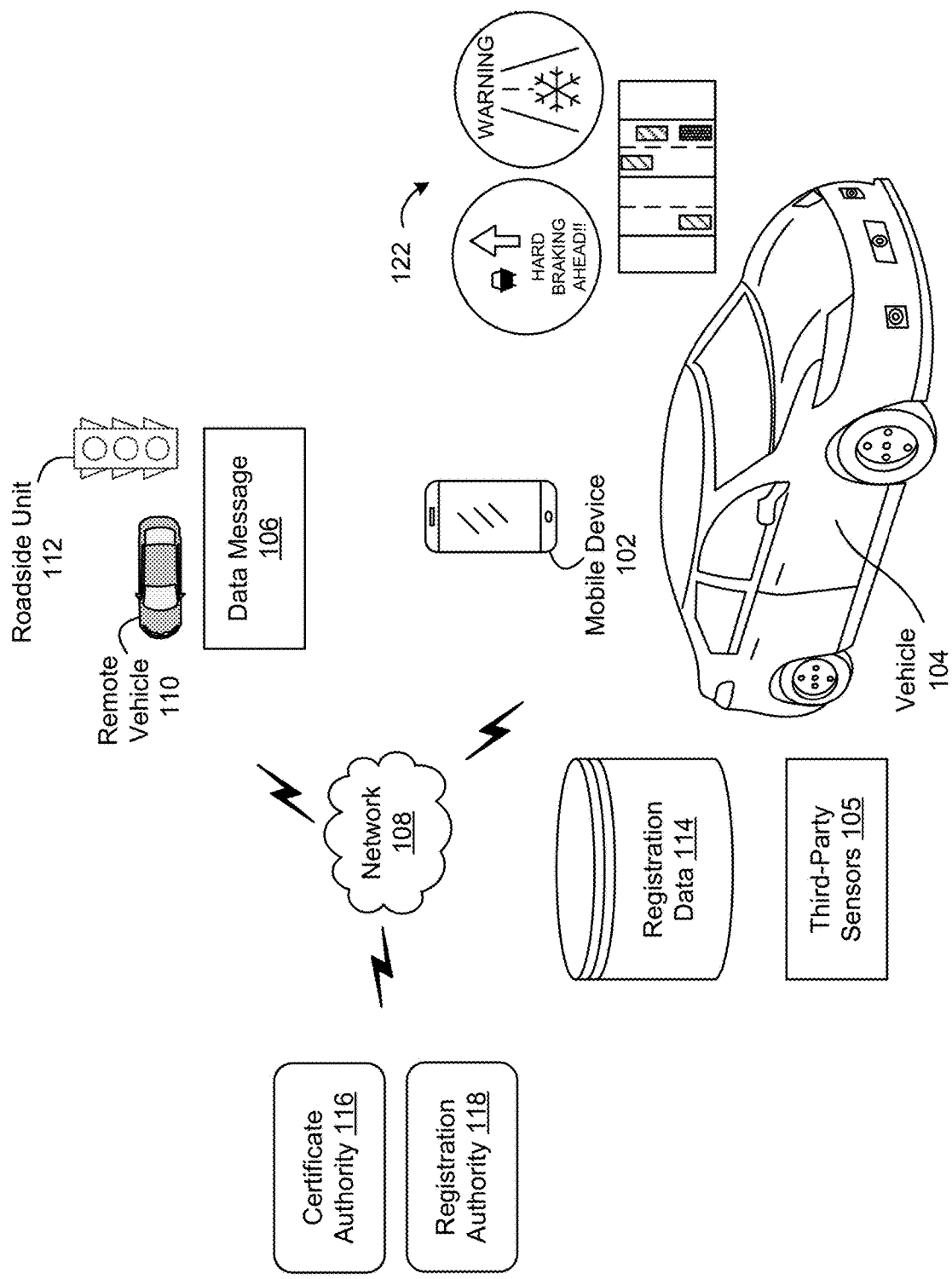
FIG. 1 is a simplified block diagram illustrating an example V2X environment, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 109 may be indicated as 109-1, 109-2, 109-3 etc. or as 109, 109, 109, etc. When referring to such an element using only the first number, any instance of the element is to be understood (e.g., element 110 in the previous example would refer to elements 109-1, 109-2, and 109-3 or to elements 109a, 109b, and 109c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

V2X-capable vehicles may execute vehicle-to-vehicle (V2V) safety applications built around Society of Automotive Engineers (SAE) J2735 BSMs, which communicate position and motion data about a vehicle's position, time, heading, speed, acceleration, predicted path, path history, and more. Other V2X messages may include, but are not limited to: cooperative awareness messages (e.g., used to announce position, movement, and basic attributes of a transmitting device), decentralized environmental notification messages (e.g., utilized to report detection of a traffic event or road hazard), signal phase and timing messages (e.g., information for one or more traffic lights), in vehicle information messages (e.g., used for providing static or dynamic road signage information for in-vehicle presentation), map messages (e.g., used for road topography and geometry information), and the like.

Not all vehicles are V2X capable. A vehicle that lacks the capability to transmit and/or receive V2X messages is referred to herein as a legacy vehicle (LV). Some techniques provided herein are directed to the utilization of a mobile device as a proxy device that receives and/or transmits and/or processes data on behalf of the legacy vehicle. The mobile device (e.g., a smartphone, a smartwatch, a laptop, a tablet, etc.) may be a separate device from the vehicle as manufactured. In some embodiments, the mobile device may be a sensor added after market. The mobile device can be a device that is different from any of the devices of the legacy vehicle as manufactured. V2X capable vehicles and proxy devices may be collectively referred to herein as V2X user devices.

In addition to transmitting position and motion data about itself/its corresponding V2X vehicle, V2X user devices can transmit position and motion data and/or any suitable sensor data it obtains about other vehicles and/or objects. In some embodiments, the one or more sensor(s) of the vehicle capabilities may be associated with corresponding trust values indicating a degree of accuracy associated with sensor data collected by these devices. These corresponding trust values may be initially ascertained based at least in part on predetermined data stored at the V2X user device or these values may be assigned to the data by another V2X participant and/or certificate authority of the V2X environment as will be discussed in further detail below. A V2X user device may transmit corresponding trust values with the sensor data it transmits.

In some embodiments, V2X user devices may be configured to obtain and transmit vehicle capabilities. As used herein, "vehicle capabilities" may describe one or more attributes of a V2X vehicle (e.g., the V2X vehicle itself, a V2X vehicle for which a mobile device operates as proxy). By way of example, vehicle capabilities may include one or more images of the vehicle, one or more identifiers associated with the vehicle (e.g., license plate, vehicle identification number (VIN), make, model, year of manufacture, type of vehicle (e.g., SUV, car, truck, sedan, etc.), and the like), one or more capabilities of the vehicle (e.g., one or more ADAS capabilities, breaking distance, sensor(s) of the vehicle as manufactured, aftermarket sensor(s) added to the vehicle, etc.), one or more physical attributes of the vehicle (e.g., color(s), dent(s) and dent location(s) (e.g., in left rear fender), rust/rust locations, cracked rear windshield, four-door, hatchback, sunroof(s) presence and state (e.g., open, closed), moonroof(s) presence and state (e.g., open, closed), roof rack/roof rack placement, bike rack/bike rack placement, trailer hitch presence, pulling a trailer (and in some embodiments, aspects of the trailer), etc.), or any suitable combination thereof. In some embodiments, vehicle capabilities may be provided by a user via a user interface of the vehicle and/or via a mobile device separate from the vehicle but in communication with the V2X capable vehicle.

In some embodiments, a V2X user device may further be configured to transmit occupant metadata (also referred to herein as "occupant data"). As used herein, "occupant metadata" includes an identifier for the occupant (e.g., an alphanumeric identifier, a first name, a middle name, a last name, a prefix, a suffix, etc.), one or more driving credentials associated with the occupant (e.g., driver's license, commercial driver's license, driving certification, driving permit, etc.), one or more a attributes of the occupant (e.g., height, hair length, skin tone, age, eyesight, reflexes, etc.), driving experience data associated with the occupant (e.g., years of experience, driving aggressiveness, number of accidents, number of at-fault accidents, etc.), one or more passenger attributes of the occupant (e.g., prone to motion sickness, sensitivities (e.g., sensitive to light, speed, temperature, traffic, noise, etc.), etc.), and the like, or any suitable combination of the above. In some embodiments, occupant metadata may be provided via a user interface of the vehicle and/or via a mobile device separate from the vehicle but in communication with the V2X capable vehicle. Various techniques for obtaining vehicle capabilities and/or occupant metadata are discussed more thoroughly below.

Each V2X capable device of the V2X environment (e.g., V2X vehicles, proxy devices, roadside units, etc.) may be required to obtain transmission authority before it may be allowed to transmit data to other devices. In some embodiments, a V2X capable device may be required to register its capabilities (e.g., ADAS capabilities, one or more sensor(s), etc.) to a certificate authority to obtain an enrollment certificate. In some embodiments, an enrollment certificate may be stored on the V2X capable device during manufacture. The certificate authority may determine whether the capabilities of the V2X capable device meet any suitable combination of transmission requirement thresholds (e.g., an accuracy threshold, a latency threshold, a throughput threshold, etc.) associated with the V2X environment. If so, the certificate authority may provide an enrollment certificate. An enrollment certificate may include device identifiers, trust values corresponding to those devices, an identifier of the certificate authority, or any suitable of the above. The V2X capable device may provide its enrollment certificate to obtain one or more transmission certificates (e.g., from a registration authority which can be the same or different from the certificate authority). A certificate authority and registration authority may collectively, or individually, be referred to as a "credential authority" and the various certificates provided by the certificate authority and/or the registration authority may individually be referred to as a "credential." A credential utilized for transmission may be referred to as a transmission credential and a credential utilized for reception may be referred to as a reception credential. In some embodiments, these transmission certificates may be provided in the messages transmitted by the V2X capable device and utilized by a recipient to validate the message. A V2X capable device may be configured not to positional and motion data, vehicle capabilities, and/or occupant data if it has not first obtained a transmission certificate. In some embodiments, a proxy device may be utilized primarily to receive V2X data but is not used to transmit via the V2X network (perhaps because it does not meet the transmission requirement threshold(s)). In these scenarios, the VCD can request a receipt certificate from the registration authority. The VCD can be configured to discard V2X messages if it has not first obtained a receipt certificate.

A V2X capable device (VCD) may receive V2X messages from remote devices (e.g., nearby V2X-capable vehicles within communication range, referred to herein as Remote Vehicles (RVs), roadside units, nearby proxy devices (PDs), etc.). For example, nearby VCDs may broadcasted BSM messages up to 10 times per second (10 Hz). Thus, if a VCD is surrounded by 200 VCDs (within a threshold distance of the VCD) each communicating up to 10 BSMs per second, the VCD may need to process up to 2000 BSM messages per second. This processing can include verifying digital signatures of the messages and determining, based on the content of the messages, whether to provide driver assistance information (e.g., alerts, alarms, graphical and/or audible data, etc.) to a driver, alter or execute a maneuver, store received data elements, retransmit received data elements, assign and/or adjust a trust value, and the like. Moreover, additional message types (e.g., non-BSM safety messages) may also be communicated to the VCD from nearby VCDs, and other communications may be received from other remote devices such as roadside units (RSUs), traffic-related servers, and more. Further, the information communicated by BSMs and other messages is often very time sensitive and must be processed quickly by the VCD before it becomes irrelevant. Thus, the VCD often has a limited ability to delay the processing of these incoming messages. This can cause a high processing load on the hardware block (e.g., Central Processing Unit (CPU), Digital Signal Processor (DSP), and/or Elliptic Curve Digital Signature Algorithm (ECDSA)) of the PD. Generating and/or providing driver assistance information (e.g., alerts, alarms, graphical presentations, audible presentations, maps, models, etc.) from the V2X messages utilizes processing resources of the VCD (and potentially the processing resources of the LV if output devices of the LV are utilized for presentation of the driver assistance information). Storing data elements from received messages (e.g., additional vehicle capabilities provided by a remote device) may utilize memory resources of the mobile device. Assigning and/or adjusting trust values corresponding to sensor(s) and/or sensor data can utilize processing resources of the VCD. Thus, it is important that the VCD include the ability to filter irrelevant messages to prevent the processing and/or memory resources of the VCD being unnecessarily wasted.

Using the techniques disclosed herein, the V2X network can include mechanisms to ensure that only approved devices can receive data via the V2X network. Additionally, the V2X network may be managed such that only devices that meet some threshold level of accuracy, latency, and/or throughput may transmit data via the V2X network, thus ensuring at least a threshold performance level of the network. By transmitting the data discussed herein, message recipients may be made aware of other vehicles (and potentially information about the vehicle and its occupants) even though the device lacks line of sight, has not collected any sensor data corresponding to that vehicle, and/or may be out of reception range to receive the message from its original source. Additionally, receiving devices may be enabled to ascertain a degree to which the data should be trusted (e.g., how accurate can the data be). Through utilizing this information from many sources, devices can be made aware of not only their own attributes, but the attributes of others. These attributes, or identifiers agreed upon by a number of V2X participants, may be utilized such that V2X messages can be directed to particular recipients, thus reducing the number of messages processed by individual devices of the network. Data received via V2X messages can be used to inform nearby vehicles' movement and maneuver execution. As a result, the accuracy of the data, latency, and throughput of the network is of great importance.

FIG. 1 is a simplified block diagram illustrating an example environment 100 (e.g., a V2X environment), according to an embodiment. By way of example, FIG. 1 depicts mobile device 102 being utilized as a proxy device for vehicle 104. In the example provided in FIG. 1, mobile device 102 can be configured to receive and/or transmit data via network 108 (e.g., a cellular network, a WiFi network, any suitable network configured for V2X communications, etc.) on behalf of the vehicle 104. In some embodiments, vehicle 104 lacks communication capabilities and/or components for the environment 100. That is, vehicle 104 (an example of a legacy vehicle) cannot transmit and/or receive V2X data messages (e.g., data message 106, a V2X message) via network 108. Data message 106 may be transmitted by any suitable remote device (e.g., RV 110, roadside unit 112, or any suitable V2X capable device (VCD) different from mobile device 102, the device being utilized to transmit and receive V2X messages for vehicle 104). It should be appreciated that mobile device 102 may be temporally located within vehicle 104 and may be utilized as a proxy device for transmitting and/or receiving V2X messages on behalf of the vehicle 104. In other embodiments, vehicle 104 may be a V2X capable vehicle that is configured to transmit and receive V2X messages via network 108. In either scenario, mobile device 102 and vehicle 104 may be communicatively coupled (e.g., via network 108, via a Bluetooth pairing, etc.) such that data may be exchanged between the mobile device and the vehicle. In some embodiments, vehicle 104 can be configured with one or more third-party sensor(s) 105 (e.g., one or more after-market sensors).

In some embodiments, the mobile device 102 and/or the vehicle 104 may be utilized to obtain registration data 114. Registration data 114 may, in some embodiments, include any suitable combination of vehicle capabilities describing attributes of the vehicle 104 and/or occupant metadata describing one or more occupants (e.g., the driver, one or more passengers) of vehicle 104.

In some embodiments, registration data 114 may be obtained during generation of a trip session or at any suitable time. A trip session may be initiated by the mobile device 102 and/or the vehicle 104 (each being referred to as a registration device) via any suitable graphical and/or audible interface (e.g., voice command) utilizing an input and/or output device of the registration device. The mobile device 102 and the vehicle 104 may be communicatively connected via any suitable communications channel (e.g., WiFi, Bluetooth, cellular, etc.) and may communicate registration data 114 between one another. Either or both devices may store the registration data 114 in local memory.

In some embodiments, a trip session may be generated automatically based on context (e.g., as a result of one or more determinations). For example, either registration device may be configured to determine that it is being utilized, or is likely to be utilized for transportation. By way of example, either registration device may determine it is being utilized and/or is likely to be utilized based at least in part on determining a Bluetooth pairing procedure (e.g., a pairing procedure executed with the mobile device 102 and the vehicle 104) has been completed, based on determining that the registration device is being used for directions, based on determining the speed at which the registration device is traveling has exceeded a threshold value, based on detecting an audio signature of a vehicle cabin, and the like. In some embodiments, the registration device may generate a trip session in response to determining that it is being utilized, or is likely to be utilized for transportation via any of the determinations listed above.

Registration data from previous trip sessions may be stored at the registration device and may be selectable, or the user may select an option to create new registration data. Any selected registration data may be modifiable by the user via the registration device(s). Subsequently, the registration device may be utilized to obtain any suitable portion of vehicle capabilities utilizing one or more interfaces and/or one or more input/output devices (e.g., a keyboard, a microphone, a camera, a display, a speaker, etc.). For example, in some embodiments, the registration device may present a graphical interface with which the user may provide any suitable user input to identify any suitable portion of vehicle capabilities. In some embodiments, the registration device may be configured to audibly request the user to provide (e.g., vocally, via a graphical interface) vehicle capabilities for the vehicle. The mobile device and/or the vehicle may be configured to receive such user input and store the received data as vehicle capabilities in an object (or another suitable storage container) associated with the vehicle.

In some embodiments, a camera of the mobile device 102 may be utilized to capture one or more images of the vehicle 104. The mobile device 102 may be configured to utilize any suitable image recognition techniques to identify one or more vehicle attributes from the one or more images (e.g., still images, video, etc.). By way of example, the mobile device may store a machine-learning model that has been previously trained to identify vehicle attributes from input data (e.g., one or more images of the vehicle). In some embodiments, the machine-learning model may be previously trained using any suitable supervised, unsupervised, semi-supervised, and/or reinforcement learning techniques. As a non-limiting example, the machine-learning model may be trained using a supervised learning technique (e.g., a classification algorithm, regression analysis, etc.) in which the model (e.g., a function) is determined for predicting an output from an input by analyzing a training data set including examples for which vehicle attributes have previously been identified. For example, the training set may include example sets of one or more images which have been previously labeled as depicting one or more vehicle attributes and/or images which have been previously identified as lacking one or more vehicle attributes. Any suitable number of vehicle attributes (e.g., color, make, model, year, dents, broken windows, blemishes, a license plate number, VIN number, registration tab data, etc.) may be captured based at least in part on the image(s) captured by the mobile device 102.

Occupant data may be obtained using one or more graphical and/or audible interfaces of the registration device in a similar manner as described above in connection with vehicle capabilities. By way of example, the registration device may be utilized to provide occupant information for a driver and/or one or more passengers of the vehicle 104 which may be stored at the mobile device 102 and/or the vehicle 104. In some embodiments, the registration device may be in communication with multiple mobile devices (e.g., a mobile device of each of a multitude of passengers). Each of these multiple mobile devices may store occupant data of its corresponding user. Thus, the registration device may, via any suitable communications channel (e.g., Bluetooth, WiFi, cellular), obtain occupant data from one or more of the other mobile devices.

Any suitable combination of the vehicle capabilities and/or occupant metadata of registration data 114 may be utilized to process data messages and/or operate the vehicle and/or perform operations. By way of example, any suitable combination of the registration data may be utilized to determine whether a received data message is relevant to the vehicle. For example, physical attributes and/or identifiers of previously stored vehicle capabilities may be compared to attributes provided in a received data message to identify whether some portion of the data provided in the message is relevant to the vehicle (e.g., more than a threshold number of attributes of the message match vehicle attributes of the vehicle capabilities). If so, the message may be processed (e.g., by the receiving device which in some embodiments may be the vehicle 104, in other embodiments, it may be the mobile device 102 operating as a proxy for the vehicle). Else, the message (or a portion of the message) may be discarded and/or ignored. As another example, the data message may be deemed relevant if data corresponding to vehicle attributes indicates a location within a threshold distance of the vehicle's known location. Thus, the vehicle and/or the proxy device may store vehicle capabilities and/or occupant metadata obtained from multiple sources (e.g., user entered, received from a remote device, etc.). Thus, received vehicle and/or occupant data may be utilized to augment registration data 114. Any suitable rule set may be utilized to determine what data is to be utilized when conflicting data occurs. In some embodiments, user entered data may be preferred over data received from a V2X data message. Thus, in some embodiments, received data may not overwrite user entered data. In other embodiments, user entered data may be preferred until conflicting information is received a threshold number of times and/or from a threshold number of sources. If either or both of these thresholds are met, the received data may be utilized to replace the user entered data stored at the registration device.

Any suitable portion of the registration data 114 may be classified with an indicator that specifies a manner by which the data will persist. Some data may be classified as being valid only for the trip session (e.g., until the vehicle 104 reaches its destination, is turned off, etc.) and may be deleted when the trip session is complete. Other data (e.g., driver's license number, license plate number, driving experience, etc.) may be classified as typically permanent and may persist until manually deleted and/or modified by a user.

In some embodiments, the environment 100 may include a certificate authority 116. The certificate authority 116 may be any suitable entity (e.g., a state or federal government agency, a network provider of the network 108, or the like). In some embodiments, a device (e.g., vehicle 104, mobile device 102) may provide some portion of registration data (e.g., data indicating one or more capabilities, and/or one or more sensor(s), and/or one or more components such as processing and memory resources of the device) to the certificate authority 116 in exchange for an enrollment certificate (not depicted). In some embodiments, an enrollment certificate may be stored in memory of the device during manufacturer or at any suitable time. In some embodiments, the enrollment certificate may include a credential associated with the certificate authority 116 (e.g., a public key of a public/private key pair associated with the certificate authority, an identifier of the certificate authority, an identifier of the device, etc.). The enrollment certificate may be utilized by the device to request one or more transmission and/or reception certificates from the registration authority 118. In some embodiments the certificate authority 116 and the registration authority 118 may be provided by the same entity (e.g., a government agency) and/or system. Methods for obtaining an enrollment, transmission, and/or reception certificates are discussed in further detail with respect to FIGS. 2-4.

In some embodiments, each transmitting device of network 108 may be required to provide a respective certificate with each data message transmitted via the network 108. In some embodiments, some portion of the data of each data message may be encrypted and/or digitally signed (e.g., using a private key of the transmitting device). The certificate issued by the certificate authority 116 may comprise a public key of the transmitting device as signed by the private key of the certificate authority. In some embodiments, the public/private key may be generated by the transmitting device and provided to the certificate authority 116 when requesting an enrollment certificate or at any suitable time. In some embodiments, a device in receipt of a data message may utilize the public key of certificate authority 116 (e.g., known from the enrollment certificate) to obtain the transmitting device's public key in order to decrypt some portion of the data message that was encrypted with the private key of the transmitting device. Additionally, or alternatively, the transmitting device's public key can be utilized to verify a digital signature of the data message, the digital signature being generated using the private key of the transmitting device.

Although only one mobile device, vehicle, remote vehicle, and roadside unit are depicted in FIG. 1, it should be appreciated that any suitable number of such devices may be utilized. In some embodiments, RV 110 may transmit data message 106. Data message 106 may be broadcasted and/or may be directed to vehicle 104 (e.g., via a network identifier by which vehicle 104 is known within network 108 and/or through the inclusion of one or more vehicle attributes of vehicle 104 different from the network identifier). The vehicle 104 or the mobile device 102 operating as proxy for the vehicle 104 (the set referred to as "the receiving device) may be configured to receive the data message 106. The receiving device may compare the vehicle attributes received via one or more data elements (e.g., data fields) of the data message 106) to the vehicle capabilities stored at the receiving device. In some embodiments, the receiving device may be configured to process the data message when the network identifier of the message matches the network identifier stored in registration data 114 and/or when a threshold number of data elements of the received message match vehicle attributes as stored as registration data 114. In some embodiments, the receiving device may discard (or process less data elements of the data message) if the network identifier of the data message 106 does not match the network identifier stored in registration data 114 and/or if the number vehicle attributes of the data messages 106 fail to match a threshold number of vehicle attributes as stored in registration data 114.

In some embodiments, the receiving device may process or discard a received data message based at least in part on the occupant metadata of registration data 114. By way of example, particular types of messages may be processed (or discarded) when the driver is a relatively inexperienced driver (e.g., occupant data indicating the occupant is the current driver and has less than a year of driving experience) while these message may be discarded (or processed) when the driver is known to be an experienced driver (e.g., a driver that has more than a year of experience). In some embodiments, the receiving device may be configured to process (or discard) certain types of data messages (e.g., data message 106) when the driver of the vehicle 104 is associated with occupant data indicating the driver has been in more than a threshold number of accidents (e.g., more than 0, more than 1, etc.) and/or more than a threshold number of accidents of a particular accident type (e.g., accidents in which the driver rear-ended another vehicle, accidents in which the driver side-swiped another vehicle, etc.). The receiving device may be configured to discard the data message if those conditions are not met as indicated by the occupant metadata.

Figure 6:
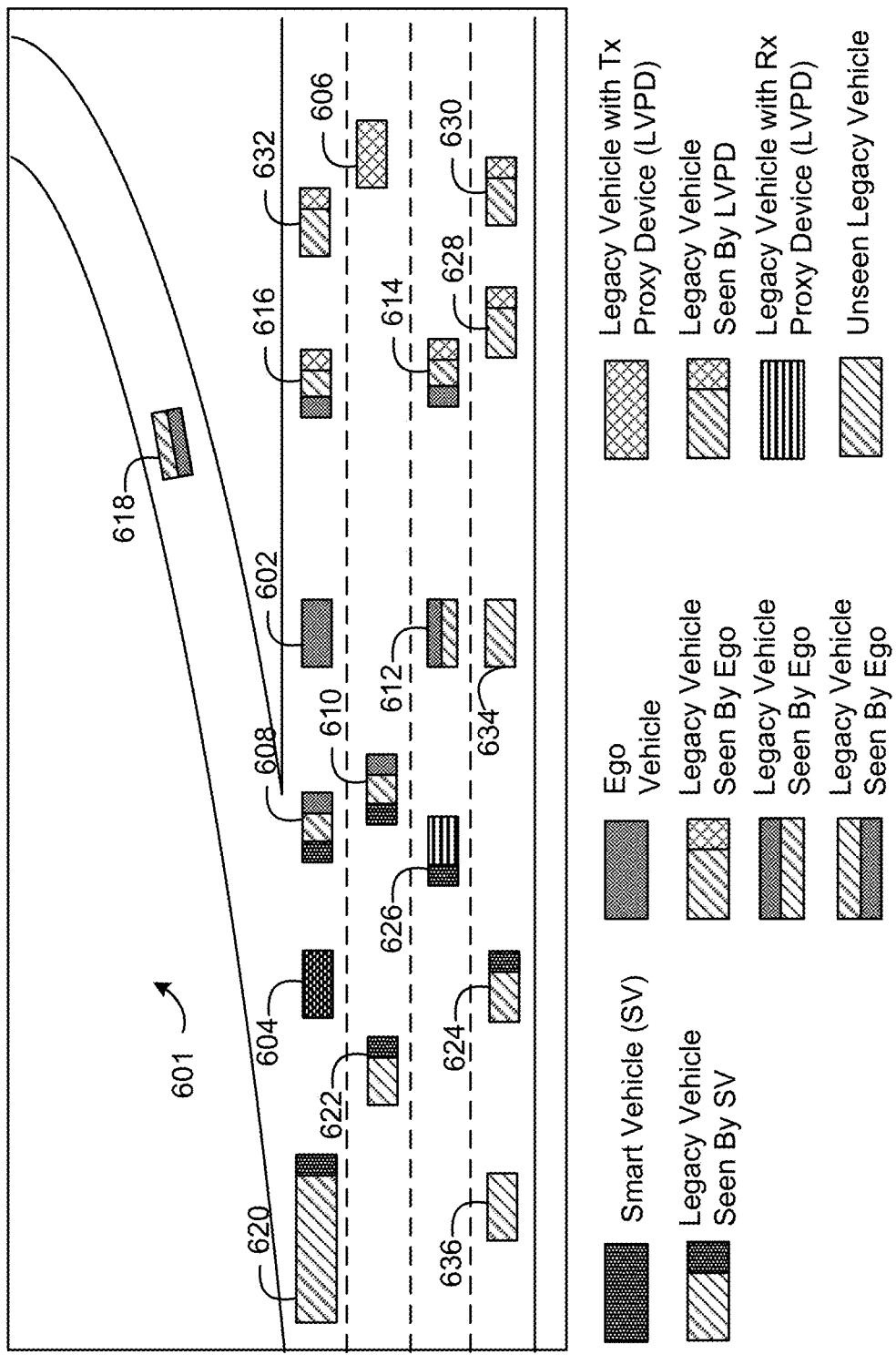
FIG. 6 is a diagram illustrating example techniques for providing a real-time traffic model, according to at least one embodiment.

The receiving device may be configured to execute any suitable operations based at least in part on processing the data message 106. By way of example, the receiving device (e.g., the mobile device operating as proxy for vehicle 104 or vehicle 104 if vehicle 104 is V2X capable) may be configured to generate driver assistance information 122. Driver assistance information 122 may include any suitable combination of graphical presentations and/or audible presentations that inform the driver of any suitable condition (e.g., weather conditions, road conditions, other driver's actions such as hard breaking, a real-time model that depicts at least locations of all V2X devices and sensed vehicles in the environment 100 within a threshold distance of the vehicle 104 or mobile device 102 if its acting as proxy for the vehicle 104). The driver assistance information 122 may be presented via one or more output devices (e.g., a display and/or speaker) of the mobile device 102 and/or one or more output devices of the vehicle 104. A real-time traffic model is discussed below in connection with FIG. 6. The real-time traffic model of FIG. 6 is intended to be an example of the driver assistance information 122.

In some embodiments, additional vehicle capabilities may be provided via the data message 106. By way of example, the mobile device 102, operating as a proxy for vehicle 104, may not currently store the color (or any suitable physical attribute) of the vehicle 104. However, RV 110 may utilize one or more of its sensors (e.g., a camera) to identify the vehicle 104 is white. The RV 110 may transmit this vehicle attribute (and/or any suitable number of vehicle attributes as identified by sensor data collected by its sensors) in data message 106. Upon receipt, the receiving device may be configured to store this additional vehicle capabilities (e.g., as part of the vehicle capabilities of registration data 114, separate from the vehicle capabilities of registration data 114). The receiving device may be configured to store this additional vehicle capabilities when it may be determined that the received vehicle capabilities is relevant to the receiving device (e.g., either describes aspects of the receiving device or the vehicle for which the receiving device operates as proxy). Determining such relevance is discussed in further detail below. In some embodiments, if the receiving device can identify that it is the only device within a threshold distance of RV 110, it may determine that any vehicle attributes provided in the message are relevant and may immediately store the received vehicle attributes with the vehicle capabilities in local memory.

In some embodiments, the receiving device may be configured to temporarily store vehicle capabilities received from a remote device until it receives the same data over a threshold number of times from a threshold number of sources (e.g., a threshold number of remote devices). In some embodiments, data that is stored temporarily may be stored separate from more reliable data (e.g., user-provided data, previously verified data, etc.). By way of example, the temporarily stored data may be stored in a separate object, log, or data container different from the data container used to store currently known registration metadata (including vehicle capabilities) of the vehicle. In some embodiments, the receiving device may be configured to store the additional vehicle capabilities (e.g., the color white) with the registration data 114 only after the same attribute has been received by at least a threshold number of different sources (e.g., three different V2X vehicles, two V2X vehicles and a roadside unit, one V2X vehicle and two proxy devices, four different sources, etc.). Thus, the receiving device may be configured to obtain vehicle capabilities from other devices of the environment 100. In some embodiments, user-provided vehicle metadata may be preferred over vehicle capabilities provided by any other source. That is, in some embodiments, user-provided data may not be overwritten with vehicle capabilities received from a remote device. In some embodiments, the user-provided data may persist until the same vehicle capabilities values have been received from multiple different sources and determined to correspond to the receiving device (or its associated vehicle).

It should be appreciated that mobile device 102 need not transmit any V2X messages on behalf of vehicle 104. In other embodiments, mobile device 102 may transmit a V2X message that indicates mobile device 102 is acting as proxy for vehicle 104. In some embodiments, other transmitting devices (e.g., RV 110 and/or roadside unit 112, other proxy devices) may utilize this knowledge when transmitting messages and/or displaying information about vehicle 104 (e.g., via real-time models presented at those vehicles/proxy devices). One example may include displaying an indication that vehicle 104 is a legacy vehicle in a real-time traffic model based at least in part on receiving a message from the mobile device 102 indicating it is operating as a proxy on behalf of vehicle 104. In some embodiments, the transmitting devices may be configured with a rule set that may cause the transmitting device to modify one or more data elements (or transmit different data elements) in a message if it is known that the recipient device is a proxy device (rather than a V2X capable vehicle).

In some embodiments, a transmitting device (e.g., mobile device 102 operating as a proxy device and/or the vehicle 104) may transmit via network 108 any suitable combination of the registration data and/or sensor data collected from any suitable sensor of the mobile device 102, the vehicle 104, and/or the third-party sensor(s) 105. By way of example, the transmitting device may transmit any suitable combination of the vehicle capabilities, occupant metadata, position and motion data of the vehicle 104, sensor data indicating position and/or motion data of one or more vehicles sensed by the sensors of mobile device 102, the vehicle 104, and/or the third-party sensor(s), sensor data such as one or more images provided by the mobile device 102, and the like.

As a non-limiting example, the transmitting device may transmit data indicating what sensors are being utilized (e.g., by the mobile device 102 and/or the vehicle 104) to collect sensor data that is also being transmitted in the message. Thus, a receiving device (e.g., RV 110) may be able to ascertain a degree of accuracy and/or trust of the sensor data provided (e.g., based at least in part on the particular sensor(s) being used for collection). Thus, if the RV 110 (or any suitable receiving device) receives sensor data from two sources regarding a common entity (e.g., vehicle 104), the receiving device may be configured to prefer the sensor data provided by the source having the more accurate sensor. In some embodiments, each device of environment 100 may be configured with a rule set that identifies the accuracy of a predefined number of sensors. In other embodiments, a degree of accuracy can also be provided in the transmitted data message and utilized by the receiver to assess whether to utilize the sensor data being provided.

Figure 2:
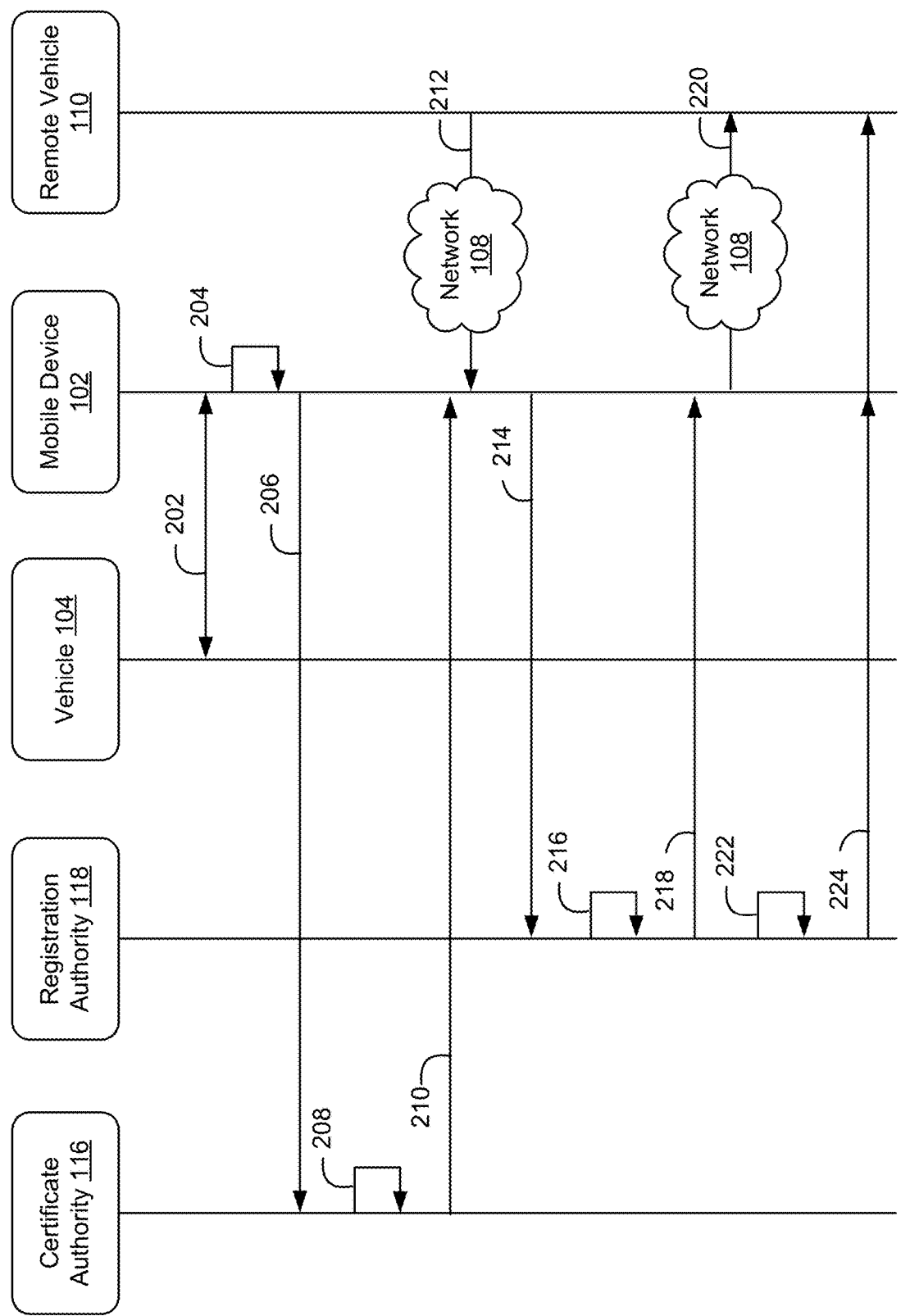
FIG. 2 is a flowchart depicting a method for obtaining transmission credentials on behalf of a vehicle, according to an embodiment.

FIG. 2 is a flowchart depicting a method 200 for obtaining transmission credentials (e.g., temporary transmission certificates) on behalf of a vehicle, according to an embodiment. The method may be performed using any suitable combination of the certificate authority 116, the registration authority 118, the vehicle 104, the mobile device 102, and the RV 110 of FIG. 1. As discussed above, in some embodiments, the certificate authority 116 and the registration authority may be provided by the same system. The example depicted in FIG. 2 is intended to illustrate a use case in which the mobile device 102 is configured to operate as a proxy device on behalf of vehicle 104 for transmit and/or receive purposes. Although the operations performed by the mobile device 102 may be similarly performed by the vehicle 104 in scenarios in which the vehicle 104 is V2X capable.

The method may begin at 202, where the mobile device 102 and 104 may perform any suitable connection procedure (e.g., a Bluetooth pairing procedure) to establish a communication connection between the mobile device 102 and the vehicle 104.

At 204, registration data may be obtained by the mobile device 102 using the techniques described above in connection with FIG. 1. It should be appreciated that all or some portion of the registration may alternatively be obtained by the vehicle 104 and communicated to mobile device 102 via the connection established at 202.

At 206, the mobile device 102 may transmit any suitable portion of vehicle capabilities to the certificate authority 116. In some embodiments, the transmitted vehicle capabilities may include identifiers of any suitable hardware and/or software ADAS capability of the vehicle 104, any suitable sensor of vehicle 104 and/or any suitable sensor(s) of mobile device 102 (or any other device paired with vehicle 104), any suitable identifier for one or more processing devices (e.g., processors) of the device that will be used for transmission (in this case, mobile device 102), and/or any suitable attribute of the vehicle 104 and/or mobile device 102. In embodiments in which the vehicle 104 includes one or more third-party sensors (e.g., third-party sensor(s) 105 of FIG. 1), sensor identifiers for each of those third-party sensors may be transmitted to the certificate authority 116 at 206. In use cases in which the vehicle 104 is V2X capable and a mobile device is not used as a proxy or for sensor data collection, the vehicle 104 may provide identifiers of any suitable combination of its ADAS capabilities, onboard sensors, and/or third-party sensors to the certificate authority 116.

At 208, the certificate authority 116 may be configured to determine, according to a predefined rule set, whether the various capabilities, sensors, and/or processing devices meet a threshold requirement for participation in the V2X network (e.g., network 108 of FIG. 1). In some embodiments, the certificate authority 116 may enforce different threshold requirements for being enrolled as a receiving device of the network 108 versus being enrolled as a transmitting device of the network 108. By enforcing transmission threshold requirements, the certificate authority 116 may ensure that processing devices and sensors being utilized for transmission meet predefined accuracy, latency, and throughput requirements of the V2X network. In some embodiments, enforcing reception threshold requirements may enable the certificate authority 116 to ensure that only certain types of devices may receive data of the V2X network.

The request at 206 may indicate whether enrollment is requested for reception and/or transmission. In some embodiments, a reception enrollment certificate may be provided to enable a device to receive data via the V2X network and a different transmission enrollment certificate may be provided to enable a device to transmit data via the V2X network. In some embodiments, the reception enrollment certificate and/or the transmission enrollment certificate may be associated with a number of certificate levels. By way of example only, a In some embodiments, the mobile device 102 may include a request type identifier in the data transmitted at 206. The request type identifier may indicate a type of certificate being requested. In some embodiments, different types enrollment certificates may be requested from and provided by the certificate authority 116. By way of example, a reception enrollment certificate may specify particular types of data that may be received and processed by the holder of the reception enrollment certificate. The receiving device (e.g., the mobile device 102) may be configured to discard all, or a portion of a data message that includes data not authorized by its reception enrollment certificate.

Similarly, a transmission enrollment certificate may specify a transmission level corresponding to certain types of data that the transmitting device (e.g., the mobile device 102) is authorized to transmit. By way of example, a transmission enrollment certificate may specify that the holder of the certificate is granted an enhanced passive transmission level, an active transmission level, or an enhanced active transmission level. A transmitting device granted an enhanced passive transmission level is granted permission to transmit data indicating it is a proxy device that is listening on the V2X network. Transmitting data indicating the proxy device is listening may enable the mobile device 102 to affect data being transmitted by other nearby devices. For example, nearby V2X devices may limit the data they transmit (e.g., for privacy, power usage, heat considerations, etc.) until they are made aware that a device is listening. In some embodiments, the data transmitted and/or protocol used by other V2X devices for transmission when it is known a proxy device is listening may differ from data/protocols used when it is not known that a proxy device is listening.

In some embodiments, an active transmission level may grant permission for the certificate holder to transmit any data allowed by an enhanced passive transmission level as well as any suitable combination of: registration data (e.g., the registration data 114 of FIG. 1) including vehicle capabilities and occupant metadata, sensor data collected by any suitable sensor of the mobile device 102, and/or any suitable data ascertained by the mobile device 102 via one or more images (e.g., images of the vehicle gauges and/or console from which speed, turn signal usage, warning lights, and the like may be determined using any suitable image recognition technique). In some embodiments, a proxy device such as mobile device 102 may be restricted from transmitting some types of data that are allowed to be transmitted by V2X capable vehicles.

In some embodiments, an enhanced active transmission level may grant permission for the certificate holder to transmit any suitable data allowed by an enhanced passive transmission level and an active transmission level as well as any suitable sensor data collected by one or more third-party sensors of the vehicle 104. In some embodiments, the mobile device 102 may be configured to certify sensor data being routed through it for transmission. Certifying sensor data may include adding a registration certificate to the sensor data before transmission. Registration certificates may be described in more detail below.

In some embodiments, the certificate authority 116 may store differing accuracy, latency, and/or throughput thresholds depending on the transmission level. In some embodiments, a particular transmission level may be requested at 206 and, at 208, the certificate authority 116 may be configured to determine whether the data received at 206 meets the accuracy, latency, and/or throughput thresholds for the request transmission level. In other embodiments, the certificate authority 116 may be configured to ascertain the highest transmission level for which corresponding accuracy, latency, and/or throughput requirements are met. The data received at 206 may additionally or alternatively include a request for a reception enrollment certificate. The certificate authority 116 may be configured to determine whether the requesting device (e.g., mobile device 102) will be granted permission to receive data via the V2X network in response to receiving the request for a reception enrollment certificate. In other embodiments, the certificate authority 116 may determine whether a reception enrollment certificate is to be granted regardless of whether the data received at 206 indicates a request for one.

At 210, the certificate authority 116 may transmit any suitable combination of a reception enrollment certificate and/or a transmission enrollment certificate granted as a result of the operations performed at 208. In some embodiments, the certificate(s) may include an identifier of the certificate authority 116 and may individually be encrypted with a private key (e.g., a private key of a public/private key pair) associated with the certificate authority 116. In some embodiments, the certificate authority's public key may be provided at any suitable time to the registration authority 118 and/or the mobile device 102.

It should be appreciated that, in some embodiments, the functionality provided by the certificate authority 116 may additionally and/or alternatively be provided by any suitable V2X capable device. That is, any suitable V2X capable device may store the predefined accuracy, latency, and/or throughput thresholds as well as any suitable predefined data indicating an accuracy, a latency, and/or a throughput associated with a sensor and/or processing device. Thus, the data transmitted by the mobile device 102 at 206 may alternatively be transmitted to any suitable V2X capable device (or broadcasted) such that a V2X capable device in receipt of the data can provide reception and/or transmission enrollment certificates in a similar manner as described above in connection with the certificate authority 116. If provided by a V2X capable device, the certificate(s) may be encrypted with a private key associated with the V2X capable device for which a corresponding public key is known by the registration authority 118 due to a previous interaction between the V2X capable device and the registration authority 118.

At 212, if a reception enrollment certificate was provided at 210, the mobile device 102 may be configured to begin receiving data from network 108 (e.g., from any suitable remote device such as the RV 110 of FIG. 1). In some embodiments, software and/or hardware of the mobile device 102 may be configured to restrict data reception in accordance with the reception enrollment certificate.

At 214, the mobile device 102 may request a temporary transmission certificate by providing its transmission enrollment certificate to the registration authority 118. In some embodiments, the registration authority 118 may be configured to manage temporary transmission certificates for all of the transmitting devices of network 108. A temporary transmission certificate may be required to be included in every data message transmitted via the network 108. The temporary transmission certificate may be used by the receiving device to verify that the transmitting device has permission to transmit data via the network 108.

At 216, the registration authority 118 may validate the transmission enrollment certificate received at 214 by decrypting the certificate using the public key associated with the certificate authority 116. The registration authority 118 may verify that the identifier of the certificate authority 116 is included in the certificate. If the registration authority 118 is not able to verify the certificate was provided by the certificate authority 116, the registration authority 118 may discard the data provided at 214. In some embodiments, it may transmit at 218 data to the mobile device 102 that indicates the registration authority 118 will not provide a temporary registration certificate to the mobile device 102. Without the temporary registration certificate, the mobile device 102 may be restricted from transmitting data, or even if it transmitted data, all receiving devices may be configured to discard the message based on determining the data message is lacking a temporary registration certificate. Alternatively, if the registration authority 118 is able to verify the certificate was generated by the certificate authority, the registration authority 118 may generate a temporary transmission certificate according to a predetermined protocol.

A temporary transmission certificate generated for the mobile device 102 may include the public key associated with the mobile device 102. In some embodiments, the registration authority 118 may generate a public/private key pair for the mobile device 102 of the mobile device 102 may have generated its own public/private key pair and provide its public key to the registration authority 118 with its transmission enrollment certificate at 214. The registration authority 118 may maintain an association between the mobile device 102 and its public key or the mobile device 102. To generate the temporary transmission certificate the registration authority 118 may encrypt the public key of the mobile device and any suitable data associated with the mobile device 102 using the registration authority's private key. A temporary transmission certificate may be utilized for a temporary period of time (e.g., one week, one day, one month, 12 hours, etc.) which may be enforced by the registration authority 118. If a temporary transmission certificate was generated, the mobile device 102 may receive the certificate and the public key of the registration authority 118 and store the received data in local memory at 218. If the public/private key pair for the mobile device 102 was generated by the registration authority 118, the private key may also be provided at 218.

At 220, the mobile device 102 may begin transmitting data via the network 108 according to permissions granted by the transmission enrollment certificate received at 210. For example, the mobile device 102 may transmit BSM data messages via the network 108. In some embodiments, software and/or hardware of the mobile device 102 may be configured to restrict data transmission in accordance with the transmission level provided in its transmission enrollment certificate. The mobile device 102 may encrypt any suitable portion of the data message using its private key. In some embodiments, the mobile device may generate and include a digital signature in the message. The mobile device 102 may insert its temporary transmission certificate in the data message prior to transmission. RV 110 (e.g., a receiver of a data message from mobile device 102) or any suitable receiver of the data message may be configured to use the public key of the registration authority 118 to decrypt the certificate in order to retrieve the public key of the mobile device 102. The public key of the mobile device 102 may then be utilized by the receiving device to decrypt any suitable portion of the data message and to validate the digital signature to ensure the authenticity of the sender and/or the integrity of the data message (e.g., to ensure the message has not been altered).

At 222, the registration authority 118 may determine, according to a predetermined protocol, that an expiration time has been reached. In response to this determination, the registration authority 118 may generate for itself a new public/private key pair.

At 224, the registration authority 118 may transmit its new public key to all previously registered V2X devices (e.g., all transmitting devices that previously obtained a temporary transmission certificate). Each device receiving this public key may be configured to discard the previously used public key of the registration authority 118 and store this new public key in memory. In some embodiments, each device having a previously provided temporary transmission certificate may be configured to obtain a new temporary transmission certificate in response to receiving the new public key of the registration authority 118. By way of example, the mobile device 102 may once again perform the operations described above at 214. The operations of 214-224 may be repeated any suitable number of times.

It should be appreciated that, as the temporary transmission certificate is obtained by the mobile device 102 based at least in part on the vehicle capabilities associated with the vehicle 104, if the mobile device 102 pairs to another vehicle, the mobile device 102 may be configured to request enrollment certificate(s) and/or temporary transmission certificates via the method 200 as applicable to the newly paired vehicle.

In some embodiments, the mobile device 102 may be allowed to transmit on the network 108 even though it cannot meet the latency, accuracy, and/or throughput requirements. In these scenarios, the mobile device 102 may be required to add metadata in its transmitted messages indicating its limitations/deficiencies.

Figure 3:
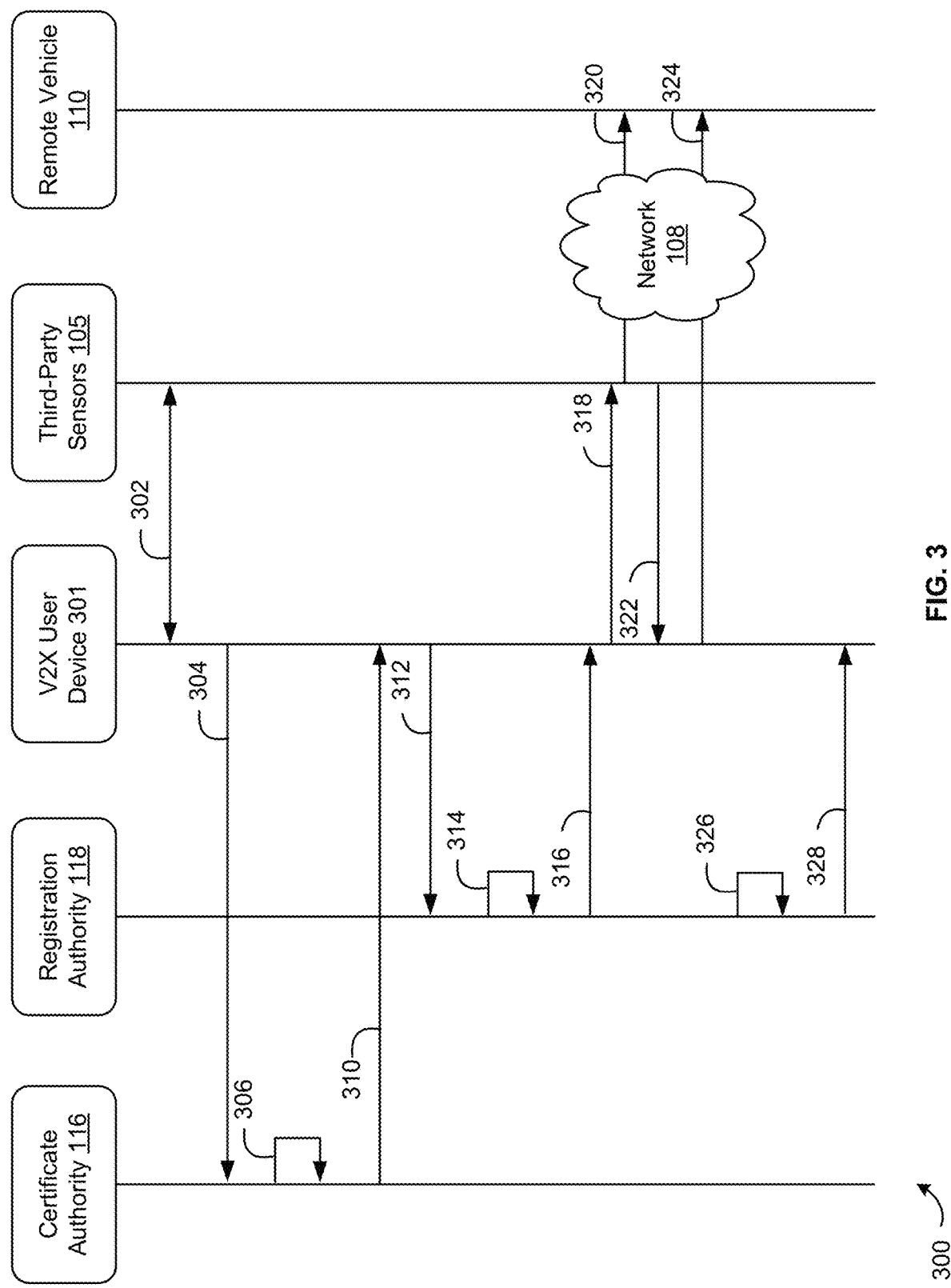
FIG. 3 is a flowchart depicting a method for obtaining transmission credentials on behalf of one or more third-party sensor(s), according to an embodiment.

FIG. 3 is a flowchart depicting a method 300 for obtaining one or more transmission credentials on behalf of one or more third-party sensor(s), according to an embodiment. In some embodiments, the V2X user device 301 (e.g., the mobile device 102 acting as proxy for the vehicle 104 of FIG. 1, or the vehicle 104 if it is a V2X capable device) may be utilized to request temporary transmission certificates for transmitting sensor data collected by one or more third-party sensor(s) 105 of FIG. 1.

The method 300 may begin at 302, where the V2X user device 301 may exchange any suitable data with the third-party sensor(s) 105 to obtain identifier(s) associated with the third-party sensor(s) 105. In some embodiments, the data exchanged at 302 may include a public key of a public/private key pair generated by the third-party sensor(s) 105 or the V2X user device 301 on behalf of each of the third-party sensor(s) 105.

At 304, the V2X user device 301 may transmit the sensor identifier(s) to the certificate authority 116. In some embodiments (e.g., when the V2X user device 301 will be transmitting the sensor data collected by the third-party sensor(s) 105), the V2X user device 301 may transmit with the sensor identifier(s) any suitable vehicle capabilities associated with the V2X user device 301 (e.g., vehicle capabilities corresponding to vehicle 104). In other embodiments (e.g., when one or more of the third-party sensor(s) 105 will transmit their own sensor data), the sensor identifier(s) for the sensors that may be potentially transmitting their own sensor data may be provided.

At 306, the certificate authority 116 may be configured to identify (e.g., via a predefined rule set) whether the data received at 304 indicates data collected by the third-party sensor(s) 105 meets the accuracy requirements and/or whether the transmitting device(s) (e.g., the V2X user device 301 and/or the third-party sensor(s) 105) are capable of meeting the latency and/or throughput transmission requirements associated with transmitting data messages via the network 108 (e.g., a V2X network). The certificate authority 116 may be configured to generate one or more transmission enrollment certificates for each of the transmitting device(s) (e.g., for the V2X user device 301 and/or any suitable combination of the third-party sensor(s) 105), that was determined to meet the accuracy and/or latency transmission requirements. As described above, the transmission enrollment certificates may indicate a transmission level corresponding to particular types of data that the certificate holder is allowed to transmit. In some embodiments, the transmitting device may be granted an enhanced active enrollment certificate in order to enable the transmitting device to transmit sensor data obtained from the third-party sensor(s) 105 (and/or to enable the third-party sensor(s) 105 to transmit their own sensor data via the network 108).

At 310, the certificate authority 116 may transmit any generated enrollment certificates to the V2X user device 301.

At 312, the V2X user device 301 may request temporary transmission certificates for the third-party sensor(s) 105 by providing each of the transmission enrollment certificates received at 310 to the registration authority 118. When the V2X user device 301 is the intended transmitting device, the transmission enrollment certificate provided at 310 and a public key of a public/private key pair generated by and associated with the V2X user device 301 may be provided at 312. When one or more of the third-party sensor(s) 105 are the intended transmitting device(s), the enrollment certificate corresponding to each third-party sensor and its corresponding public key generated at 302 may be provided at 312. As discussed above, the registration authority 118 may be configured to manage temporary transmission certificates for all of the transmitting devices of network 108.

At 314, the registration authority 118 may validate the transmission enrollment certificate(s) received at 312 by decrypting the certificate(s) using the public key associated with the certificate authority 116. The registration authority 118 may verify that the identifier of the certificate authority 116 is included in each certificate. If the registration authority 118 is not able to verify the certificate(s) were provided by the certificate authority 116, the registration authority 118 may discard the data provided at 312.

At 316, the registration authority 118 may transmit data to the V2X user device 301 that indicates the registration authority 118 either will not provide the temporary registration certificate(s) requested (e.g., because it could not verify one or more certificate(s) provided at 312) or the registration authority 118 may provide the generated temporary transmission certificates at 316. If the third-party sensor(s) 105 are the intended transmission devices, the V2X user device 301 may forward the temporary transmission certificates to the third-party sensor(s) 105 which may then use the temporary transmission certificates to transmit their individual sensor data via the network 108 at 320. The third-party sensor(s) 105 may utilize their temporary transmission certificate to encrypt and/or digitally the message (or one or more portions of the message) and the temporary transmission certificate may be included in the transmitted message. The RV 110 may decrypt and verify the data message using the techniques discussed above in connection with FIG. 2 at 220.

If the V2X user device 301 is the intended transmitter, then the operations of 318 and 320 may be skipped and the method may proceed to 322 where sensor data collected by the third-party sensor(s) 105 may be provided to the V2X user device 301. The V2X user device 301 may be configured to encrypt and/or digitally sign any suitable portion of the sensor data and transmit encrypted/digitally signed data with temporary transmission certificate via the network 108 at 324. The temporary transmission certificate(s) transmitted at 320 and/or at 324 may include the public key of the transmitting device as signed by the private key of the registration authority 118. Thus, the temporary transmission certificate(s) transmitted at 320 and/or 324 may be used by the receiving device (e.g., the RV 110) to obtain the public key of the transmitting device which may be used to validate the digital signature and/or to decrypt a portion of the received message.

At 326, the registration authority 118 may determine, according to a predetermined protocol, that an expiration time has been reached. In response to this determination, the registration authority 118 may generate for itself a new public/private key pair.

At 328, the registration authority 118 may transmit its new public key to all previously registered V2X devices (e.g., all transmitting devices that previously obtained a temporary transmission certificate for itself or on behalf of another device). Each device receiving this public key (e.g., the V2X user device 301) may be configured to discard the previously used public key of the registration authority 118 and store this new public key in memory. In some embodiments, each device having a previously provided one or more temporary transmission certificates may be configured to obtain new temporary transmission certificate(s) in response to receiving the new public key of the registration authority 118. By way of example, the method may return to 312. The operations of 312 to 328 may be repeated any suitable number of times.

FIG. 4 is a flowchart depicting a method 400 for utilizing a plurality of mobile devices to determine V2X transmission data, according to an embodiment. Although FIGS. 1-3 depicted a single mobile device acting as proxy for a single vehicle, any suitable number of mobile devices may act as proxy for a single vehicle. By way of example, mobile device 102 may be a smartphone of the driver (or passenger) of vehicle 104 and the mobile device 402 may be a smartphone of a passenger of the vehicle 104. In some embodiments, the mobile device(s) may conform to a master/slave model in which one device (a master) processes data provided by the other devices (slaves) and serves as the group's communication hub.

The method 400 may begin at 404, where the mobile device 102 and the mobile device 402 may execute any suitable election algorithm to determine which of the two devices will be assigned as "master" and which will be the "slave." For the purposes of illustration, mobile device 102 may be selected as the master.

At 406, the mobile device 102 may obtain vehicle data from the vehicle 104 and configuration data from the mobile device 402 identifying the various sensor(s), processing device(s), memory resource(s) and the like, utilized by each device.

At 408, the mobile device 102 may execute operations similar to method 200 to obtain a reception and/or transmission enrollment certificate from a certificate authority (e.g., the certificate authority 116 of FIG. 2, an RSU of the network 108, a remote vehicle (e.g., RV 110), etc.). In some embodiments, the mobile device 102 may send the certificate authority a superset of data including the vehicle capabilities associated with the vehicle 104, the configuration data associated with the mobile device 402, and its own configuration data identifying the various sensor(s), processing device(s), memory resource(s) and the like, utilized by mobile device 102.

Assuming a reception enrollment certificate was received in response to the operations performed at 408, the mobile device 102 may begin receiving data from the network 108 (e.g., from the RV 110) at 410.

At 412, the mobile device 102 may perform any suitable operations associated with receiving and/or processing a data message. By way of example, the mobile device 102 may determine whether the data message is relevant to the vehicle 104 by determining one or more data elements of the data message match a particular threshold of vehicle attributes ascertained from registration data (e.g., the registration data 114 of FIG. 1). As another example, if the message is deemed relevant and it contains data elements that provide additional vehicle capabilities for vehicle 104, the mobile device may store the additional vehicle capabilities in local memory with the registration data 114 thereby augmenting the data known about vehicle 104's attributes. In some embodiments, the mobile device 102 may be configured to generate driver assistance information. By way of example, the mobile device 102 may generate any suitable alarm, alert, and/or the real-time traffic model discussed below with respect to FIG. 6.

At 414, the driver assistance information generated at 412 may be transmitted to the vehicle 104 at 414 for presentation. In some embodiments, the driver assistance information may be displayed graphically at a display of the vehicle 104 and/or the driver assistance information may be presented audibly. According to some embodiments, the data message received at 410 may include a message type. Example message types may include "vehicle to vehicle," "proxy vehicle to vehicle," "vehicle to human driver," "human driver to vehicle," "human driver to human driver," or "general broadcast." Any suitable data provided from the data message may be color coded and/or otherwise visually distinguishable such that a driver or passenger viewing the information at a display of the vehicle 104 may distinguish data from each of the message types. By way of example, some data provided from a vehicle to the human driver may be displayed in blue text, while data provided by another human driver may be provided in red.

Assuming a transmission enrollment certificate was received in response to the operations of 408, the method may proceed to 416, where the mobile device 102 may transmit the transmission enrollment certificate to a registration authority (e.g., the registration authority 118 of FIG. 1) to request one or more temporary transmission certificates. In some embodiments, the mobile device 102 may generated a public/private key pair and transmit the public key with the transmission enrollment certificate at 410.

At 418, the mobile device 102 may obtain sensor data from the vehicle 104 and/or the mobile device 402. It should be appreciated that data may be obtained from these devices at the same time, at different times, according to a schedule, a periodicity, or at any suitable time. In some embodiments, the sensor(s) of mobile device 402 and/or vehicle 104 may collect sensor data at any suitable time and communicate the data to the mobile device 102 for transmission.

At 420, the mobile device 102 may be configured to format the sensor data collected from vehicle 104 and/or mobile device 402 and/or sensor data collected by one or more of its own onboard sensors and transmit one or more data message via network 108. By way of example, the mobile device 102 may transmit a BSM which may be received by RV 110 (a participant of the network 108). In some embodiments, the data message(s) transmitted at 420 may be broadcasted, or the data message(s) may be directed to a specific addressee as may be discussed in further detail with respect to FIG. 7.

FIGS. 5A-5C illustrate techniques for assigning a trust value to one or more entities of a V2X environment, according to an embodiment. A trust value may quantify a degree of accuracy with which the data provided by a device may be trusted. Any suitable numbering protocol may be utilized. The particular values used in the following examples are merely illustrative and are not intended to limited the scope of this disclosure. Although a legacy vehicle (LV), a remote vehicle (RV), and a proxy device (PD) operating as proxy for a legacy vehicle are used for the following examples, any suitable combination of V2X capable devices (PDs, RVs, RSUs, etc.) may be similarly utilized.

FIG. 5A depicts a number of V2X capable devices transmitting data with corresponding trust values. By way of example, RV 504 and PD 506, in the course of their respective operations may obtain sensor data indicating a speed measurement of the LV 502. For example, the sensor(s) of RV 504 may identify the speed of LV 502 as 20 miles per hour (mph) while the PD 506 may obtain sensor data (from its own sensors or sensors of the vehicle and/or other mobile devices in the vehicle) identifying the speed of LV 502 as 22 mph. The RV 504 may transmit a trust value (e.g., 50) with its measurement indicating that the sensor that obtained the data is configured to be accurate within 0.5 mph, plus or minus. Similarly, the PD 506 may transmit the measurement of 22 mph with a trust value (e.g., 30) indicating that the sensor that obtained the data is configured to be accurate within 3 mph.

In some embodiments, the PD 506 may be configured to prefer (e.g., utilize) the measurement provided by the RV 504 based at least in part on the trust values associated and/or provided with the respective measurements, as RV 504's data is more likely to be more accurate than the sensor data obtained by the PD 506.

In some embodiments, because the PD 506's measurement was within the known error range of the sensor, and because the PD 506 provided an indication of the accuracy of the measurement, the trust value associated with the PD 506 (at least for speed measurements) may be left unchanged.

FIG. 5B depicts an example in which a trust value may be modified. Continuing with the example provided in FIG. 5A. If the trust value of PD 506 instead indicated an accuracy with 1 mph, the RV 504 and/or the PD 506 may identify that the PD 506's trust value is not indicative of the actual accuracy of the measurement. In some embodiments, either RV 504 may transmit a data message to PD 506 to modify the trust value associated with that sensor or PD 506 may identify the discrepancy itself and adjust its trust value accordingly (e.g., to 20) to indicate a new accuracy (e.g., an accuracy within 2 mph). Going forward, the PD 506 may use this trust value when reporting out measurements from that sensor.

Thus, in some embodiments, each portion of data may be provided with a trust value indicating the accuracy of the sensor that obtained the data. In some embodiments, a V2X capable device may manage many trust values corresponding to each sensors to which it has access. In some embodiments, the V2X capable device may compute an aggregated trust value (e.g., an average trust value of all its sensors). In either scenario the trust value(s) may be adjusted upward or downward over time as other sources of data are used to identify the accuracy of the data provided by the V2X capable device. It should be appreciated that only a V2X capable device having sensor(s) with a high trust value may cause a trust value of another device's sensors to be adjusted upward. That is at least because only a device with a higher degree of accuracy could confirm a higher degree of accuracy in the other device.

FIG. 5C depicts another view of the ongoing example in which a new RV arrives. RV 508 may, in some embodiments, operate with a default trust value associated with the sensor(s) with which its measurement is provided. In some embodiments, the RV 504, the PD 506, or any suitable V2X capable device may be configured to assign a trust value to the measurement provided by RV 508.

By way of example, PD 506 may ascertain, based at least in part on the measurement it provided of 22 mph, that the speed measurement of 21 mph falls within its own error range (e.g., 22 mph+ or −2 mph). Thus, PD 506 may, at most, identify the trust value of RV 508 as being at least as accurate as itself and transmit data to PD 506 indicating the measurement provided by RV 508 should be associated with at least a trust value of 20. Similarly, RV 504 may be configured to determine that the measurement provided by RV 508 is within a 1 mph of the actual speed of the LV 502 (at least as determined by RV 504). RV 504 may ascertain, based at least in part on its own speed measurement of 20 mph, that the speed measurement of 21 mph provided by RV 508 is within a 1 mph of the speed of the LV 502 (at least as determined by RV 504). Therefore, RV 504 may identify a trust value for the RV 508 (e.g., 40) that is less than its own trust value (e.g., 50) to indicate a higher degree accuracy that that of the measurements provided by PD 506, but a lesser degree of accuracy with respect to the measurements provided by the RV 504. As each V2X capable device operate, the trust value(s) it maintains may fluctuate over time. In some embodiments, if a trust value for a particular sensor drops below a threshold value, driver assistance information may be generated by that device to alert the user of a possible hardware and/or software failure in that sensor.

FIG. 6 is a diagram illustrating example techniques for providing a real-time traffic model 600, according to at least one embodiment. Real-time traffic model 600 is intended to be an example of the driver assistance information 122 of FIG. 1. In some embodiments, the real-time traffic model 600 may be generated by a proxy device (e.g., mobile device of FIG. 1) or any suitable V2X device capable of receiving data via the network 108 of FIG. 1 (e.g., a V2X network). The data elements of the real-time traffic model 600 may be derived and generated based at least in part on data elements received via any suitable combination of V2X messages received from any suitable number of sources. In some embodiments, the real-time traffic model 600 may include a map 601 representing an area (e.g., a threshold distance from the device generated the model) and a number of vehicles within that area (e.g., vehicles 602-632). The vehicles 634 and 636 are depicted in FIG. 6 to indicate that two additional vehicles are physically present in the area, however, these vehicles are not displayed in the real-time traffic model 600 for reasons that will be discussed further below.

As depicted in FIG. 6, the real-time traffic model 600 depicts an "ego vehicle" (e.g., ego vehicle 602) which is the vehicle for which the real-time traffic model 600 is generated and displayed. The real-time traffic model 600 may be generated by components of the ego vehicle (e.g., processor(s) 1110 of FIG. 1) or at least some aspects of the real-time traffic model 600 may be generated by the proxy device associated with the ego vehicle (e.g., by the processor(s) 1310 of FIG. 13). In some embodiments, the ego vehicle 602 may be depicted in a different color and/or style from the other graphical elements representing other vehicles such that the color and/or style visually distinguishes the ego vehicle 602 from the other vehicles of the real-time traffic model 600. In some embodiments, the ego vehicle 602 (or its proxy device that may be generating the real-time traffic model 600) may be configured to access sensor(s) that may collect data indicating the presence and various attributes of vehicles. 608-618 as depicted in FIG. 6.

In some embodiments, vehicle 604 is a smart vehicle (e.g., V2X capable vehicle) and vehicle 606 is a legacy vehicle with a transmitting proxy device. Vehicles 604 and the proxy device of vehicle 606 may be configured to access respective sensors that may collect data indicating the presence and various attributes of other vehicles with the area. For example, vehicle 604 may obtain sensor data indicating the presence and various attributes of the vehicles 608, 610, and 620-626. Likewise, the proxy device of vehicle 606 may obtain sensor data indicating the presence and various attributes of vehicles 614, 616, and 628-632. Vehicles 634 and 636 may not be displayed in the real-time traffic model 600 since there are no transmitting vehicles (or transmitting proxy devices) that are collecting sensor data for these vehicles. Each of the vehicles 634 and 636 are shielded by other vehicles such they are not detected by the ego vehicle 602, nor either smart vehicle 604 or 606. Vehicle 626 could, if configured with suitable sensors (e.g., proximity sensors, cameras, LIDAR, SONAR, RADAR, etc.), potentially obtain sensor data on vehicles 634 and 636. Thus, a real-time traffic model generated at the vehicle 626 could display the vehicles 634 and 636 based on data collected from its own sensors. However, because vehicle 626 is a legacy vehicle that includes a proxy device that is receiving only from the V2X network, none of the other vehicles 602, 603, or 606 can display the presence and/or data associated with vehicles 634 and 636 on their respective real-time traffic models.

Each of the vehicles 602, 604, and 606 are V2X capable devices (e.g., V2X capable vehicles or a vehicle that includes a proxy device) that may be configured to transmit respective vehicle attributes and/or vehicle attributes of the other vehicles sensed by the respective devices. Vehicles 608-624 and 628-636 are intended to depict legacy vehicles (e.g., vehicles that are not V2X capable). In some embodiments, if vehicle 626 includes a proxy device that transmits data indicating it is listening on the network, then the real-time traffic models generated by vehicles 602-606 (including the real-time traffic model 600) may display some distinguishing feature to indicate the vehicle 626 includes a receiving proxy device. Else, the vehicle 626 may be displayed similarly to each of the other legacy vehicles (e.g., vehicles 608-624).

Each of the graphical elements of the real-time traffic model 600 depicting vehicles 602-632 may correspond to a stored object maintained by the ego vehicle (or a proxy device that operates as a proxy on behalf of the ego vehicle 602). In some embodiments, the object may store a correlation of data from many data sources. By way of example, an object corresponding to vehicle 608 may include data that was provided by the vehicle 602 and the vehicle 604. The object for vehicle 610 may store data that was provided by vehicles 602 and 604. The objects can store any suitable vehicle attribute such as color, make, model, image(s) of the vehicle, license plate number, speed, acceleration, heading, identifying features (e.g., broken left tail light, dent in right rear fender, broken windshield, etc.), vehicle states (e.g., on fire, smoking, traveling well below the current speed limit, right blinker on, left blinker on, etc.), occupant metadata, or the like. In a similar vein, vehicles 614 and 616 may correspond to respective object that hold data provided by vehicles 602 and 606.

The data corresponding to the vehicles 608, 610, 614, and 616 (collectively referred to as anchor vehicles) may be utilized as points of reference. By way of example, while graphical elements may be displayed for vehicles 608-618 due to the ego vehicle 602 having sensor data on each vehicle, vehicles 620-632 may be stored as objects and graphically displayed due to receiving data from either vehicle 604 or vehicle 606 indicating the position and/or attributes of each vehicle in relation to the anchor vehicles. Thus, although the ego vehicle 602 does not itself collect sensor data on vehicles 620-632, it nevertheless is aware of the vehicles presence and potentially various attributes of each vehicle based on receiving such data from other V2X transmitting vehicles in the nearby area. Thus, the real-time traffic model 600 may include graphical elements representing vehicles 608-632 even though those vehicles are not transmitting V2X messages about themselves (or at all).

Each type of vehicle (e.g., ego, smart, legacy with transmitting PD, legacy with receiving PD, legacy (PD unknown), etc.) may be visually distinguishable based at least in part on any suitable attribute (e.g., color, shape, text, etc.). It should be appreciated that the depiction of the real-time traffic model is intended to be illustrative and non-limiting.

In some embodiments, each of the vehicle 602-606 may be configured to collectively determine a unique identifier for themselves and the vehicles 608-632 using any suitable protocol. In some embodiments, vehicles 602-606 may utilize a unique vehicle attribute (e.g., license plate number) to identify a vehicle if that attribute is known from various sensor data (or in their own cases, vehicle capabilities). Else, the vehicle 602-606 may generate a unique identifier for each vehicle. In some embodiments, vehicles 602-606 may subsequently direct a V2X message to any suitable vehicle of vehicles 602-632. For example, vehicle 602 may send a data message (e.g., a human to human message type) that includes information indicating a warning directed to the driver/occupant(s) of vehicle 604 from the driver of vehicle 602 that vehicle 618 is fast approaching vehicle 608 from behind and to the left and appears to be aggressively driving. This may be helpful to the operations of vehicle 604 as vehicle 604 and/or the driver/occupant(s) of vehicle 604 may not yet be aware of vehicle 618. In some embodiments, a unique identifier need not be determined, rather, V2X data messages may include attributes of the vehicle to which a message is related and/or directed. Thus, in some embodiments, rather than using a particular identifier determined by a collective of V2X devices (e.g., V2X1234), attributes of the vehicle may be used to identify an intended recipient of the message (e.g., white, Acme, four-door sedan.

Figure 13:
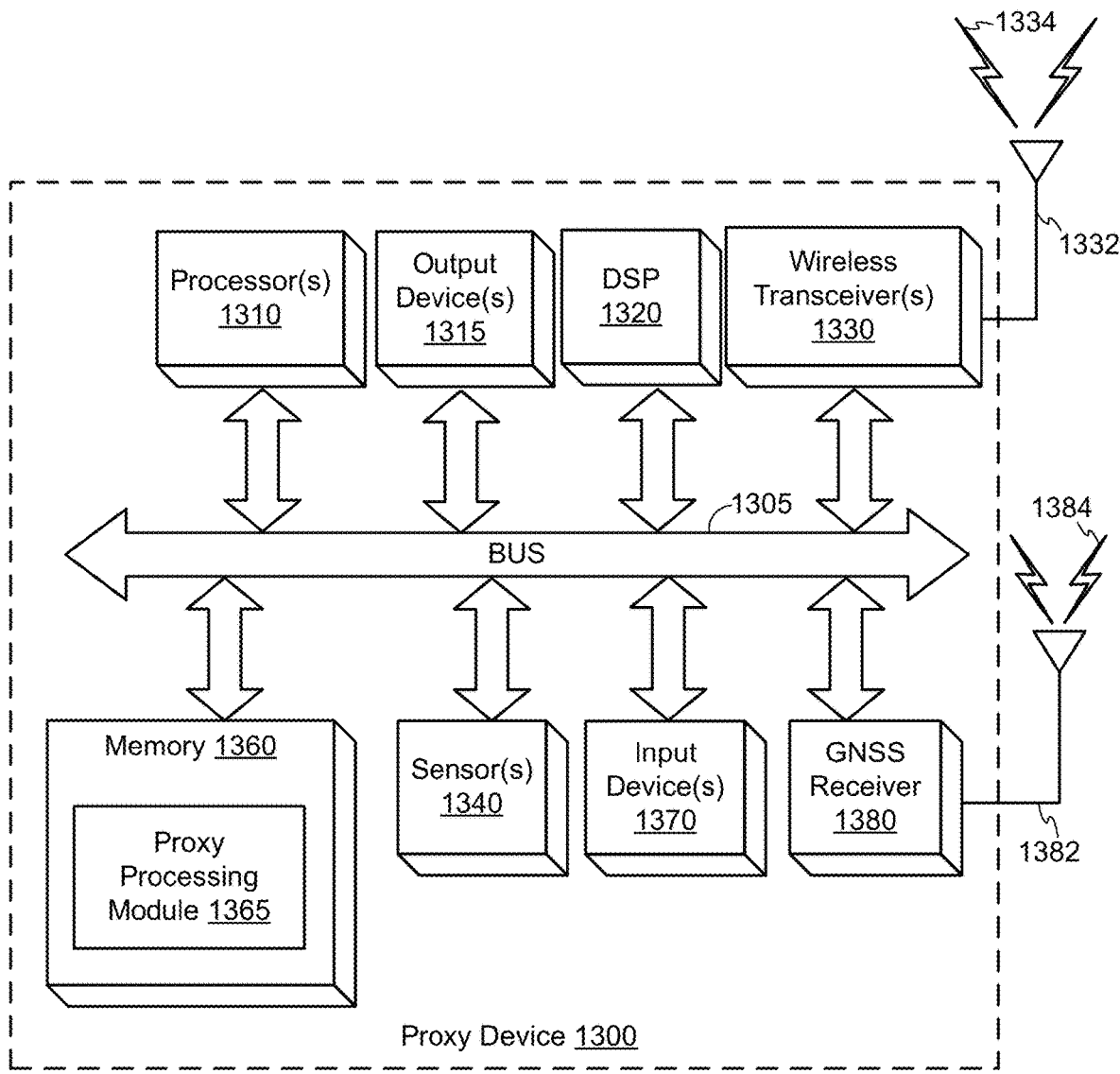
FIG. 13 comprises a functional block diagram of an example mobile device (e.g., a proxy device), according to an embodiment.

Means for providing the real-time traffic model may include one or more software and/or hardware components of a proxy device, such as a bus 1305, processor(s) 1310, memory 1360, wireless transceiver(s) 1330, proxy processing module 1365, and output device(s) 1315 as illustrated in FIG. 13, which is described in more detail below.

Figure 11:
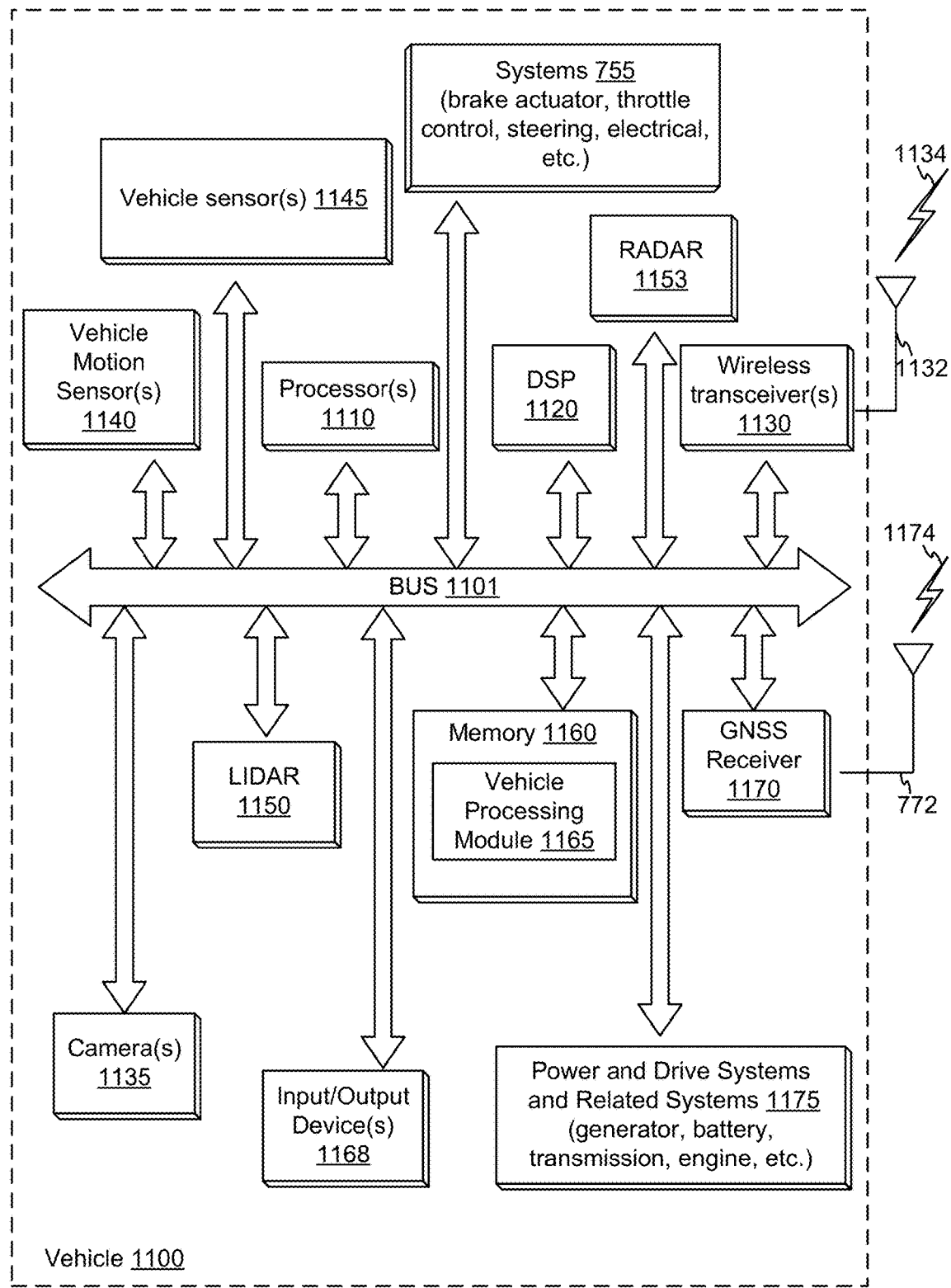
FIG. 11 is a block diagram of various hardware and software components of a vehicle, according to an embodiment.

In some embodiments, means for providing the real-time traffic model may include one or more software and/or hardware components of V2X capable vehicle (e.g., vehicle 1100 of FIG. 1), such as a bus 1101, processor(s) 1110, memory 1160, wireless transceiver(s) 1130, vehicle processing module 1165, and input/output device(s) 1168 as illustrated in FIG. 11, which is described in more detail below.

Figure 7:
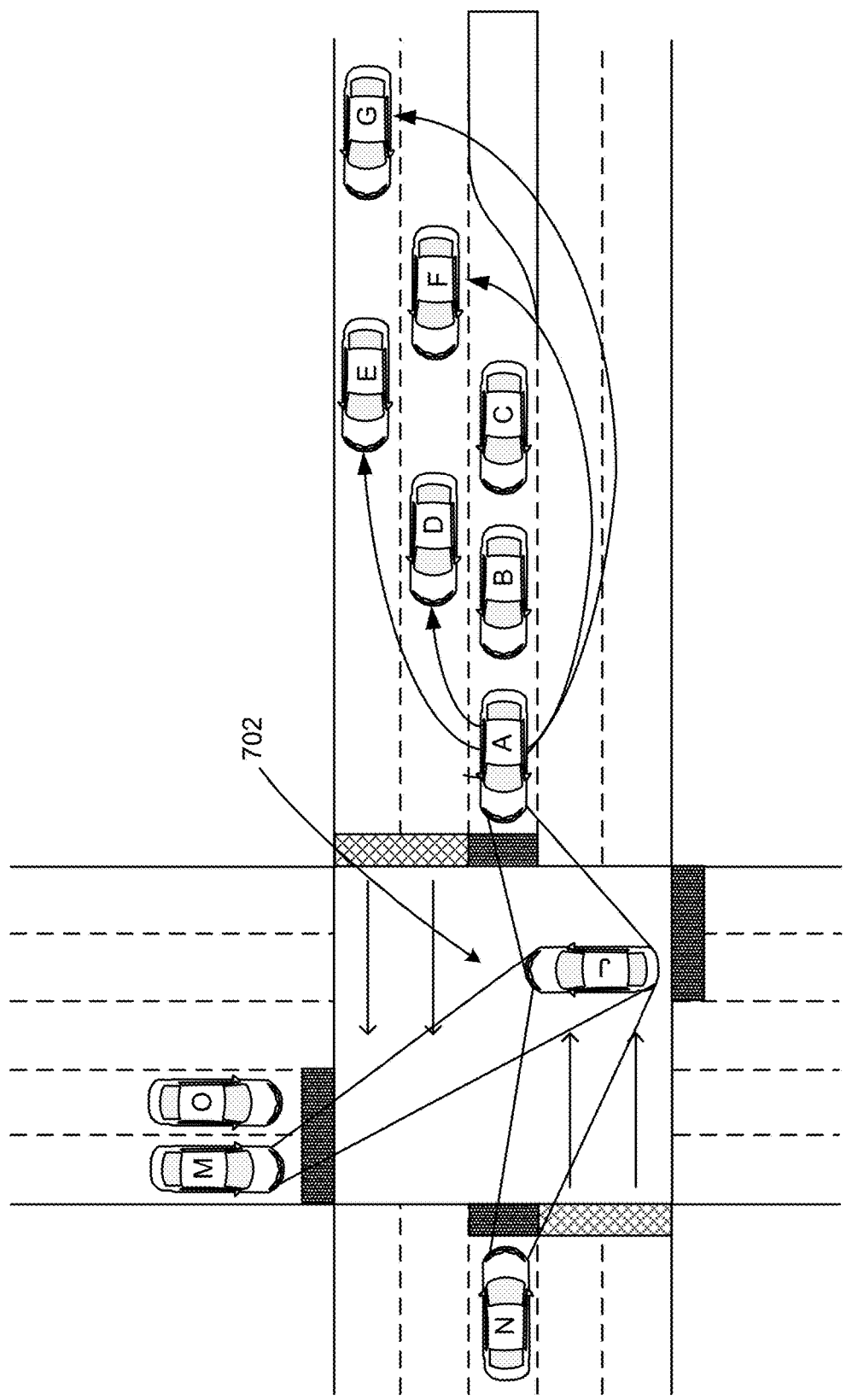
FIG. 7 is a diagram illustrating example techniques for utilizing directed messages in a V2X environment, according to at least one embodiment.

FIG. 7 is a diagram illustrating example techniques for utilizing directed messages in a V2X environment 700 (e.g., an example of environment 100 of FIG. 1), according to at least one embodiment. Vehicles A-D, Vehicle N, and Vehicle M may be V2X capable devices (e.g., V2X capable vehicles and/or vehicles with a V2X capable proxy device). While previously traveling, vehicle A may have become aware of various vehicle attributes associated with any suitable combination of vehicle A-G. These attributes may have been transmitted by any suitable combination of vehicle B-D in a manner similar to that described in FIG. 6. Subsequently, vehicle A may stop at intersection 702 in accordance with a red light signal and traffic laws. Vehicles N and M may also be stopped at intersection 702.

At a subsequent point in time, any suitable combination of vehicles A, N, and/or M may collect sensor data indicating that vehicle J is running a red light, creating a potential for a collision. In some embodiments, any suitable combination of vehicles A, N, and/or M may broadcast a V2X message indicating the actions of vehicle J to warn other vehicles of the potential danger. In some embodiments, vehicle A may be configured to determine (from its own sensor data ant that provided by vehicle B and/or C) that vehicles B and C are stopped behind him. In some embodiments, vehicle A may direct data messages specifically to vehicles D, E, F, and G using any suitable combination of unique V2X identifiers previously assigned to the vehicles as described in FIG. 6 and/or any suitable attribute previously received relating to the vehicles D, E, F, and G. In some embodiments, if vehicle A is aware of the general positions of vehicles D-G, it may be configured to send directed messages only to vehicles D and E as these vehicles may slow themselves to cause vehicles F and G to slow as well.

Figure 8:
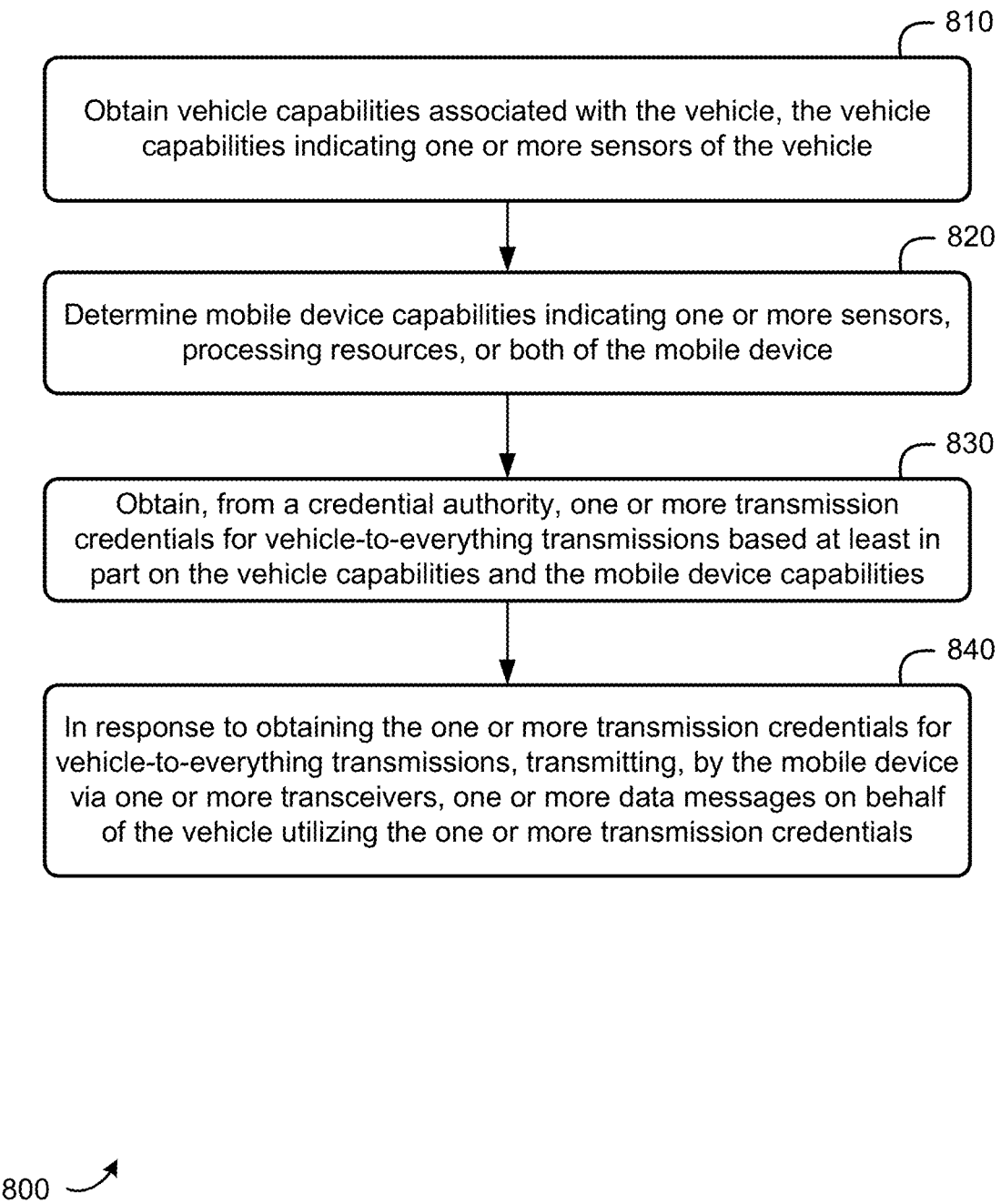
FIG. 8 is a flowchart depicting a method for managing data transmission by a mobile device on behalf of a second device in a V2X environment.

FIG. 8 is a flowchart depicting a method 800 for transmitting data by a mobile device (e.g., the mobile device 102 of FIGS. 1-4) on behalf of a vehicle (e.g., the vehicle 104 of FIGS. 1-4). In some embodiments, the mobile device may comprise a memory (e.g., a non-transitory computer-readable medium) storing executable instructions for transmitting the data on behalf of the vehicle and one or more processors communicatively coupled with the memory, the one or more processors being configured to perform the method 800 based on executing the instructions stored in memory. The means for performing method 800 may include the software and/or hardware components of a proxy device 1300, such as a bus 1305, processor(s) 1310, memory 1360, wireless transceiver(s) 1330, proxy processing module 1365, and output device(s) 1315 as illustrated in FIG. 13, which is described in more detail below.

The method 800 may begin at 810, where vehicle capabilities associated with the vehicle is obtained. In some embodiments, the vehicle capabilities indicate one or more sensors of the vehicle.

At 820, the mobile device may determine mobile device capabilities indicating one or more sensors, processing resources, or both of the mobile device.

At 830, the mobile device may obtain one or more transmission credentials (e.g., for vehicle-to-everything transmissions within a V2X network) from a credential authority (e.g., the certificate authority 116 and/or the registration authority 118 of FIGS. 1-4) based at least in part on the vehicle capabilities and the mobile device capabilities.

At 840, in response to obtaining the one or more transmission credentials for vehicle-to-everything transmissions, the mobile device may transmit, via one or more transceivers (e.g., the wireless transceiver(s) 1330 of FIG. 13), one or more data messages on behalf of the vehicle utilizing the one or more transmission credentials.

FIGS. 9-13 are illustrations of systems, structural devices, vehicle components, and other devices, components, and systems that can be used to implement the techniques provided herein for detecting a degree of motion sickness that a person may be experiencing while traveling in an autonomously driven vehicle.

Figure 9:
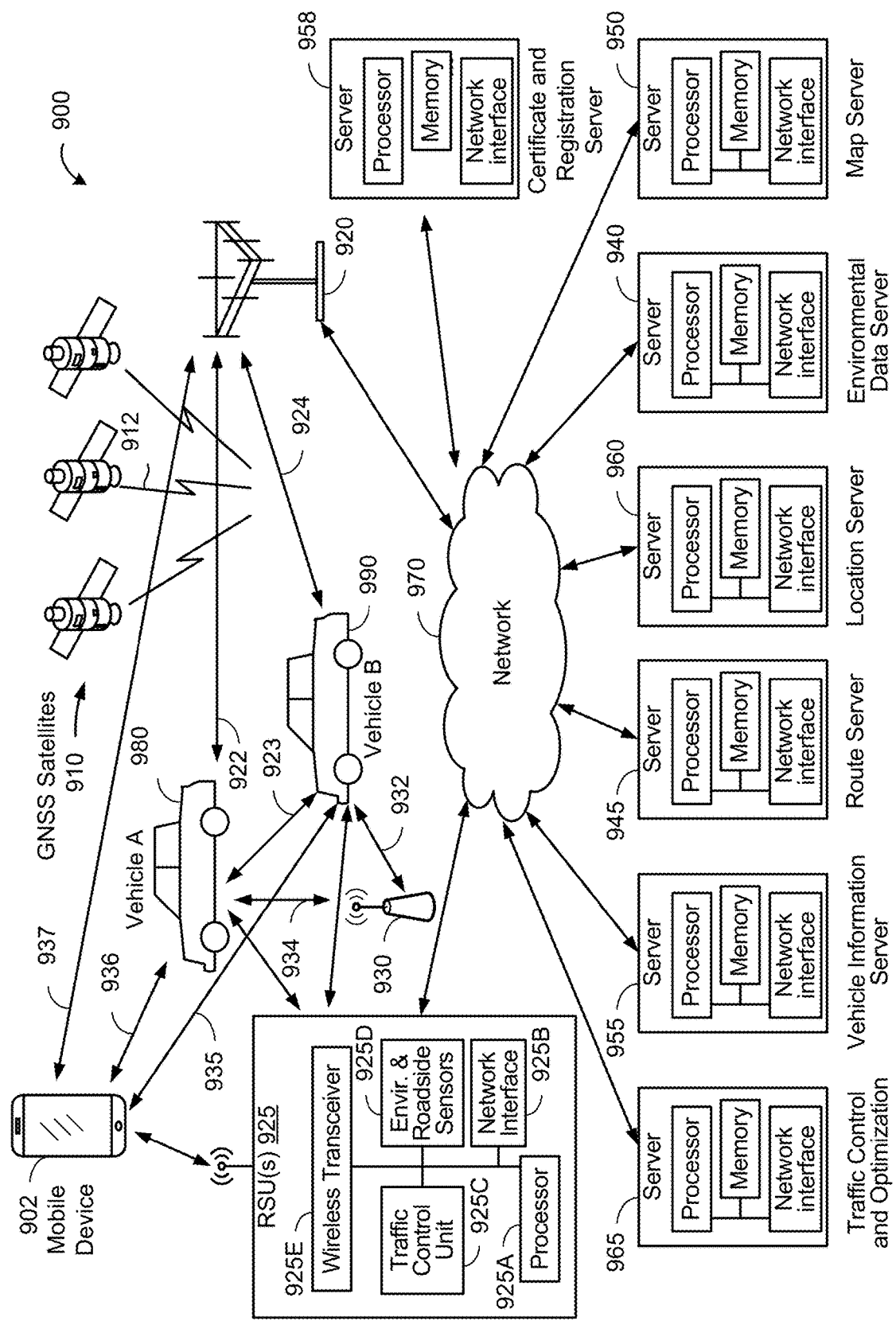
FIG. 9 is an illustration of a system in which V2X capable devices (e.g., vehicles, proxy devices, RSUs, servers, etc.) may communicate over various networks, according to an embodiment.

FIG. 9 is an illustration of a system 900 in V2X capable devices (e.g., vehicles, proxy devices, RSUs, servers, etc.) may communicate over various networks, according to an embodiment. In an embodiment, vehicle A 980 may communicate, using V2X or other wireless communication transceiver over link 923, with V2X or otherwise communication-transceiver-enabled vehicle B 990, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, and/or calculated status, vehicle capabilities, occupant metadata, and to exchange other V2X vehicle status steps that may not be covered in the V2X capability data elements. In an embodiment, vehicle A 980 may also communicate with vehicle B 990 through a network, for example, via wireless signals 922 to/from base station 920 and/or via wireless signals 932 to/from an access point 930, or via one or more communication-enabled RSU(s) 925, any of which may relay communication, information and/or convert protocols for use by other vehicles, such as vehicle B 990, particularly in an embodiment where vehicle B 990 is not capable of communicating directly with vehicle A 980 in a common protocol. In an embodiment, RSU(s) may comprise various types of roadside beacons, traffic and/or vehicular monitors, traffic control devices, and location beacons.

In some embodiments, vehicle A 980 may lack V2X communication components (or such communications components are faulty and/or disabled) such that it cannot send and/or receive V2X data elements with other entities of system 900 (e.g., vehicle B 990, RSU(s) 925, servers 940, 945, 950, 955, 960, 965, 968, etc.). A vehicle that is unable to participate in V2X communications is referred to herein as a "legacy vehicle." Thus, in some embodiments, vehicle A 980 is a legacy vehicle. In some embodiments, mobile device 902 (an example of the proxy device 1300 of FIG. 13), may be configured to act as a proxy on behalf of vehicle A 980. Mobile device 902 can be configured to send and/or receive V2X messages to/from any suitable combination of the entities of the system 900 (e.g., vehicle B 990, RSU(s) 925, servers 940, 945, 950, 955, 960, 965, 968, etc.). Mobile device 902 may be configured to send and/or receive wireless messages in various protocols with vehicle A 980 (or any suitable component of vehicle A 980) by using various Wide Area Network (WAN), Wireless Local Area Network (WLAN), and/or Personal Area Network (PAN) protocols to communicate over a wireless communication network. In an embodiment, the mobile device 902 may comprise various combinations of WAN, WLAN and/or PAN transceivers. In an embodiment, these transceivers may include a Bluetooth® transceiver, a ZigBee transceiver, and/or other PAN transceiver. A local transceiver, a WAN wireless transceiver, and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with a mobile device 902 over a wireless link, and claimed subject matter is not limited in this respect.

In some embodiments, mobile device 902 may communicate with vehicle A 980 via a PAN such as a Bluetooth network. In some embodiments, mobile device 902 may communicate with vehicle A 980 via link 936 or through a network, for example, via wireless signals 937 to/from base station 920 and/or via wireless signals 934 to/from an access point 930, or via one or more communication-enabled RSU(s) 925, any of which may relay communication, information and/or convert protocols for use by other vehicles, such as vehicle B 990, particularly in an embodiment where vehicle B 990 is not capable of communicating directly with vehicle A 980 in a common protocol.

Mobile device 902 may be configured to receive any suitable vehicle data from any suitable combination of components of vehicle A 980 (e.g., vehicle sensor(s) 1145, vehicle motion sensor(s) 1140, camera(s) 1135, RADAR 1153, LIDAR 1150, power and drive systems and related systems 1175, input/output device(s) 1168, and/or systems 1155) via one or more communication networks. In some embodiments, mobile device 902 may be configured to receive vehicle capabilities and/or occupant metadata from one or more interfaces of the mobile device 902, based on one or more images captured by the mobile device 902, from vehicle A 980, or any suitable combination of the above. Mobile device 902 may be configured with one or more sensors and may exchange locally acquired sensor data with the vehicle. In some embodiments, the mobile device 902 may be configured to interface (send and/or receive data) with the input/output device(s) 1168 of FIG. 11). For example, the mobile device 902 may present data via the input/output device(s) 1168 and/or the mobile device 902 may receive data (e.g., user input) collected and provided by the input/output device(s) 1168 of vehicle A 980.

It should be appreciated that any suitable sensor of the sensors/components 1135, 1140, 1145, 1150, 1153 may be installed after market. Thus, any of the sensors/components 1135, 1140, 1145, 1150, 1153 may be an example of a third-party sensor (e.g., of the third-party sensor(s) 105 of FIG. 1).

Mobile device 902 may be configured to generate driver assistance information (e.g., the driver assistance information 122 of FIG. 1) based at least in part on received V2X message data. By way of example, mobile device 902 may be configured with code (e.g., proxy processing module 1365 of FIG. 13) that, when executed, causes visual and/or audible data (e.g., driver assistance information) to be generated that indicates at least a portion of the data received via one or more V2X messages. As a simplistic example, the mobile device 902 may receive a V2X message indicating that the vehicle located in from of vehicle A 980 is breaking hard. The mobile device 902 may determine the V2X message is relevant to vehicle A 980 and generate visual and/or audible data that may be presented at the mobile device 902 via a display and/or a speaker of the mobile device and/or at a display and/or speaker of the vehicle A 980 (e.g., via input/output device(s) 1168). The visual and/or audible data may indicate the breaking is occurring up ahead, alerting the driver to the chance of collision.

Mobile device 902 may be configured to store vehicle and/or occupant metadata provided by a user or received as V2X message data. By way of example, mobile device 902 may be configured with code (e.g., the proxy processing module 1365 of FIG. 13) that may perform any suitable operations discussed herein with respect to managing, obtaining, storing, classifying, or otherwise interacting with vehicle capabilities and/or occupant metadata. In some embodiments, the mobile device 902 may determine the V2X message is relevant to vehicle A 980 based at least in part on comparing vehicle capabilities and/or occupant metadata received from a V2X message with vehicle capabilities and/or occupant metadata stored at the mobile device. In some embodiments, the proxy processing module 1365 may be configured with code, that when executed, obtains occupant metadata from one or more nearby user devices (e.g., a plurality of mobile devices).

Mobile device 902 may be configured to receive any suitable V2X data message from any suitable V2X capable device of the system 900. In some embodiments, the mobile device 902 may correlate the received data with any suitable data stored locally at the mobile device 902 (e.g., vehicle capabilities, occupant metadata, sensor data, etc.) and may store data corresponding to an entity and received from different sources in a single data container and/or in associated data containers.

In some embodiments, the mobile device 902 may be configured to transmit any suitable data (e.g., vehicle capabilities, occupant metadata, sensor data, trust values, weather data, road conditions, objects detect, etc.) via any suitable V2X data message. In some embodiments, these data messages may be broadcasted or the data messages may be directed (e.g., utilizing a unique identifier and/or one or more attributes of the intended recipient). In some embodiments, the mobile device 902 may be configured to obtain any suitable enrollment certificate and/or temporary transmission certificates for itself and/or on behalf of any suitable number of devices (e.g., third-party sensor(s) 105 of FIG. 1) according to the methods 200 and 300 discussed above.

In some embodiments, the mobile device 902 may act in concert with one or more other mobile devices for data collection and/or transmission purposes. By way of example, the mobile device 902 may perform the functionality discussed above in connection with either of the mobile devices of FIG. 4.

Generally, any of the functionality discussed in FIGS. 1-8 as being performed by a mobile device may be performed by mobile device 902 (e.g., by executing code of the proxy processing module 1365 of FIG. 13).

Mobile device 902 may communicate, using V2X or other wireless communication transceiver over link 935, with V2X or otherwise communication-transceiver-enabled vehicle B 990, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, vehicle capabilities, occupant metadata, and/or calculated status, and to exchange other V2X vehicle status steps that may not be covered in the V2X capability data elements. In an embodiment, mobile device 902 may also communicate with vehicle B 990 through a network, for example, via wireless signals 937 to/from base station 920 and/or via wireless signals 934 to/from an access point 930, or via one or more communication-enabled RSU(s) 925, any of which may relay communication, information and/or convert protocols for use by other vehicles, such as vehicle B 990, particularly in an embodiment where vehicle B 990 is not capable of communicating directly with vehicle A 980 in a common protocol.

In an embodiment, RSU(s) 925 may have a processor 925A configured to operate wireless transceiver 925E to send and receive wireless messages, for example, BSM or Cooperative Awareness Messages (CAM) or other V2X messages to/from vehicle A 980 and/or vehicle B 990 and/or mobile device 902, from base station 920 and/or access point 930. For example, wireless transceiver 925E may send and/or receive wireless messages in various protocols such as V2X communication with vehicles, and/or using various Wide Area Network (WAN), Wireless Local Area Network (WLAN), and/or Personal Area Network (PAN) protocols to communicate over a wireless communication network. In an embodiment RSU(s) 925 may contain one or more processors 925A communicatively coupled to wireless transceiver 925E and memory, and may contain instructions and/or hardware to perform as a traffic control unit 925C and/or to provide and/or process environmental and roadside sensor information 925D or to act as a location reference for GNSS relative location between it and vehicles. In an embodiment, RSU(s) 925 may contain a network interface 925B (and/or a wireless transceiver 925E), which, in an embodiment, may communicate with external servers such as traffic optimization server 965, vehicle information server 955, and/or environmental data server 940. In an embodiment, wireless transceiver 925E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 925E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 925 over a wireless link, and claimed subject matter is not limited in this respect.

RSU(s) 925 may receive location, status, GNSS and other sensor measurements, and capability information from vehicle A 980 and/or vehicle B 990 and/or mobile device 902 such as GNSS measurements, sensor measurements, velocity, heading, location, stopping distance, priority or emergency status and other vehicle-related information such as vehicle capabilities, occupant metadata, and the like. In some embodiments, mobile device 902 may obtain such data from vehicle A 980. In an embodiment, environmental information such as road surface information/status, weather status, and camera information may be gathered and shared with vehicles, either via point to point or broadcast messaging. RSU(s) 925 may utilize received information, via wireless transceiver 925E, from vehicle A 980 and/or vehicle B 990 and/or mobile device 902, environmental and roadside sensors 925D, and network information and control messages from, for example, traffic control and optimization server 965 to coordinate and direct traffic flow and to provide environmental, vehicular, safety and announcement messages to vehicle A 980 and vehicle B 990. In an embodiment, RSU(s) 925 may be configured to request and/or receive receipt enrollment certificates, transmission enrollment certificates, and/or one or more temporary transmission certificates, or any suitable combination of the above from the certificate and registration server 958. In some embodiments, the certificate and registration server 958 may perform any suitable functionality discussed above with respect to the certificate authority 116 and/or the registration authority 118 of FIGS. 1-4 and 8.

Processor 925A may be configured to operate a network interface 925B, in an embodiment, which may be connected via a backhaul to network 970, and which may be used, in an embodiment, to communicate and coordinate with various centralized servers such as a centralized traffic control and optimization server 965 that monitors and optimizes the flow of traffic in an area such as within a city or a section of a city or in a region. Network interface 925B may also be utilized for remote access to RSU(s) 925 for crowd sourcing of vehicle data, maintenance of the RSU(s) 925, and/or coordination with other RSU(s) 925 or other uses. RSU(s) 925 may have a processor 925A configured to operate traffic control unit 925C which may be configured to process data received from vehicles such as vehicle A 980 and vehicle B 990 such as location data, stopping distance data, road condition data, identification data and other information related to the status and location of nearby vehicles and environment. RSU(s) 925 may have a processor 925A configured to obtain data from environmental and roadside sensors 925D, which may include temperature, weather, camera, pressure sensors, road sensors (for car detection, for example), accident detection, movement detection, speed detection and other vehicle and environmental monitoring sensors.

In an embodiment, vehicle A 980 may also communicate with mobile device 902 using short range communication and personal networks such as Bluetooth, Wi-Fi or Zigbee or via V2X or other vehicle-related communication protocols, for example, in an embodiment to access WAN and/or Wi-Fi networks and/or, in an embodiment, to obtain sensor and/or location measurements from mobile device 902. In an embodiment, vehicle A 980 may communicate with mobile device 902 using WAN related protocols through a WAN network, such as via WAN base station 920 or using Wi-Fi either directly peer to peer or via a Wi-Fi access point. Vehicle A 980 and/or vehicle B 990 may communicate using various communication protocols. In an embodiment, vehicle A 980 and/or vehicle B 990 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A 980 may communicate over WAN networks using WAN protocols via base station 920 or with wireless LAN access point 930 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 980 and/or vehicle B 990 and/or mobile device 902, in an embodiment, may contain one or more GNSS receivers (e.g., GNSS receiver 1170 for vehicle A and/or B, GNSS receiver 1180 for mobile device 902) for reception of GNSS signals 912, from GNSS satellites 910, for location determination, time acquisition and time maintenance. Various GNSS systems may be supported alone or in combination, using GNSS receiver xxx or other receiver, to receive signals from Beidou, Galileo, GLONASS, and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 925, one or more wireless LAN access point 930 or one or more base stations 920. Various GNSS signals 912 may be utilized in conjunction with car sensors to determine location, velocity, proximity to other vehicles such as between vehicle A 980 and vehicle B 990.

In an embodiment, vehicle A and/or vehicle B may access GNSS measurements and/or locations determined at least in part using GNSS as provided by mobile device 902, which, in an embodiment would also have GNSS, WAN, Wi-Fi and other communications receivers and/or transceivers. In an embodiment, vehicle A 980 and/or vehicle B 990 may access GNSS measurements (such as pseudorange measurements, Doppler measurements and satellite IDs) and/or locations determined at least in part using GNSS as provided by mobile device 902 as a fallback in case GNSS receiver 770 fails or provides less than a threshold level of location accuracy.

Vehicle A 980 and/or Vehicle B 990 and/or mobile device 902 (as proxy for vehicle A 980) may access various servers on the network such as vehicle information server 955, route server 945, location server 960, map server 950, environmental data server 940, and certificate and registration server 968. In some embodiments, vehicle A 980 and/or vehicle B 990 may be configured to request and/or receive receipt enrollment certificates, transmission enrollment certificates, and/or one or more temporary transmission certificates, or any suitable combination of the above from the certificate and registration server 958.

Vehicle information server 955, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 955 may also provide information in regard to vehicle size, shape, capabilities, identification, ownership, occupancy, and/or determined location point (such as, for example, the location of the GNSS receiver) and the location of the car boundaries relative to the determined location point.

Route server 945, may receive current location and destination information, and provide routing information for the vehicle, map data, alternative route data and/or traffic and street conditions data.

Location server 960, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 950 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 940 may, in an embodiment, provide weather and/or road related information, traffic information, terrain information, and/or road quality & speed information and/or other pertinent environmental data.

In an embodiment, Vehicles 980 and 990 and mobile devices 902, in FIG. 9, may communication over network 970 via various network access points such as wireless LAN access point 930 or wireless WAN base station 920 over network 970. Any suitable combination of vehicles 980, 990, and mobile devices 902 may also, in some embodiments, communicate directly between devices, between vehicles and device to vehicle and vehicle to device using various short range communications mechanisms to communicate directly without going over network 870, such as via Bluetooth, Zigbee and 5G new radio standards.

Figure 10:
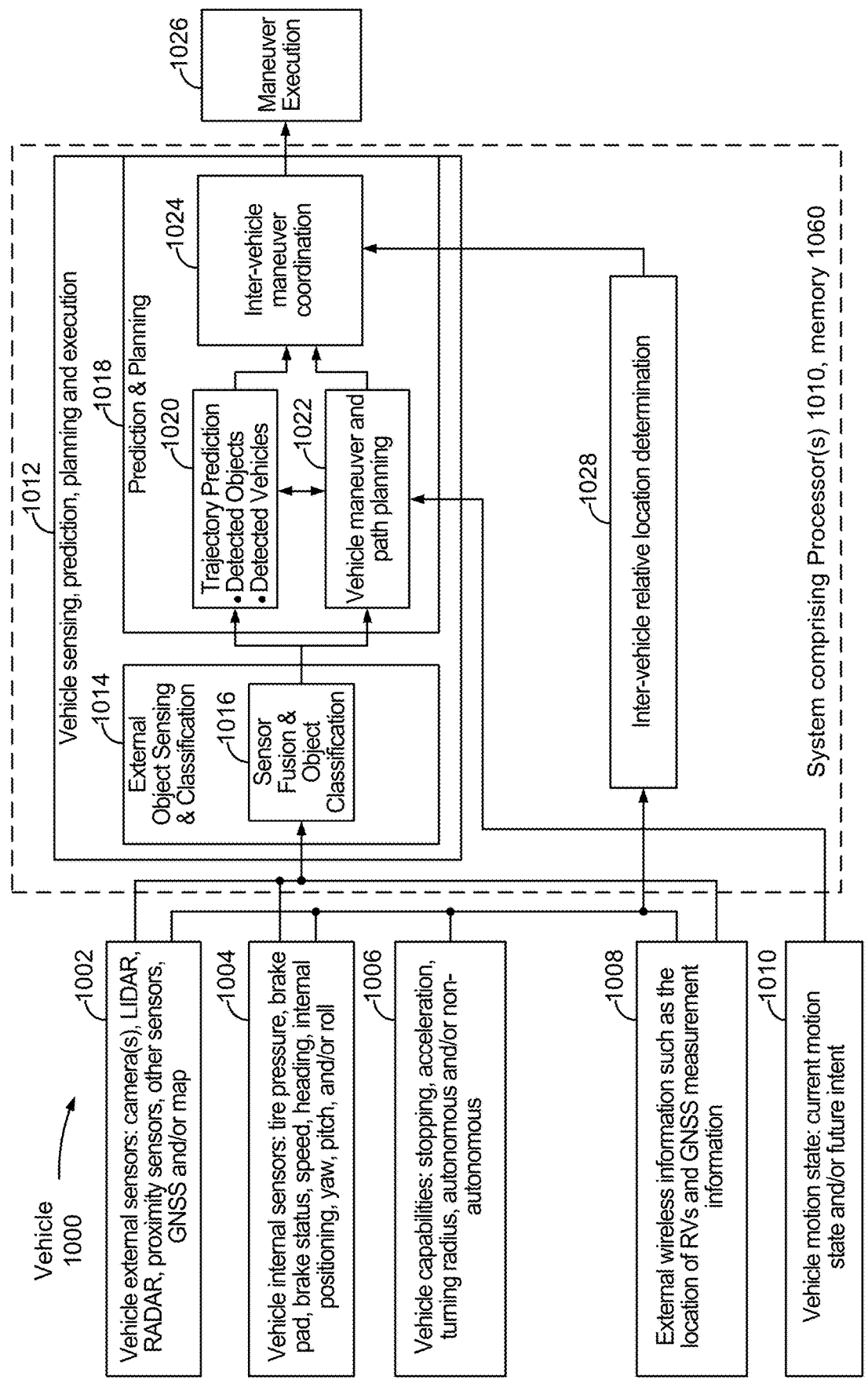
FIG. 10 comprises a functional block diagram of a vehicle, according to an embodiment.

FIG. 10 comprises a functional block diagram of a vehicle 1000, according to an embodiment. The vehicle 1000 we correspond to vehicle 104 and/or RV 110 of FIG. 1, as described in the embodiments above. Moreover, hardware and/or software components for executing the blocks shown in FIG. 10 are illustrated in FIG. 11 and described in more detail below.

As shown in FIG. 10, vehicle 1000 may receive vehicle and environment information from vehicle external sensors 1002, vehicle internal sensors 1004, vehicle capabilities 1006, external wireless information such as the location of RVs and GNSS measurement information 1008 (from the environment, from other vehicles, from RSU(s), from system servers) and/or from vehicle motion state 1010 (describing current and/or future motion states). The messages received by the vehicle 104 and/or RV 110 of FIG. 1 described in the embodiments above, for example, may convey the data provided in blocks 1008 and/or 1010. The received vehicle, sensor, and environment information may, in an embodiment, be processed in one or more processor(s) 1110, DSP 1120 and memory 1160 (further described in FIG. 1), connected and configured to provide external object sensing and classification, prediction and planning, and maneuver execution, as well as to determine and update V2X or other wireless data element values, including GNSS data element values, and to transmit, via one or more wireless transceiver(s) 1130, messaging including the determined data elements. The messaging and data elements may be sent and received via various means, protocols and standards, such as via SAE or European Telecommunications Standards Institute (ETSI) CV2X messages and data elements or other wireless and wireless V2X protocols supported by wireless transceiver(s) 1130. In some embodiments, vehicle 1100 may be a legacy vehicle, lacking the ability to exchange messages and/or data elements via CV2X messages and/or via wireless V2X protocols. Thus, in some embodiments, vehicle 1100 may receive V2X data elements from CV2X messages received by the mobile device 902 of FIG. 9 (e.g., an example of the proxy device 1300 discussed below in connection with FIG. 13). In embodiments in which the mobile device 902 acts as a proxy for the vehicle 1000, any suitable data received by the vehicle 1000 may additionally and/or alternatively be received by the vehicle 1000 from the mobile device 902 (after the mobile device 902 has received the data from the source of the data such as the servers 940, 945, 950, 955, 960, 965, and/or 968 of FIG. 9, the RSU(s) 925, vehicle B 990, and the like).

Inter-vehicle relative location determination block 1028 may be used to determine relative location of vehicles in an area of interest. In an embodiment, GNSS data is exchanged with vehicles (e.g., RVs), or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages (e.g., BSMs) from other vehicles other devices and location information for vehicle 1000 to determine an approximate relative location and/or an approximate range between vehicles.

In an embodiment, other vehicle-related input sources, such as servers 955, 945, 960, 950, and 940 of FIG. 9, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 1024 to determine maneuver execution 1026. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 950 may be utilized in conjunction with relative and/or absolute data from neighboring vehicles and/or from RSU(s) 925 to determine high confidence absolute location for a plurality of vehicles and relative location with respect to the road/map. For example, if vehicle A 980 of FIG. 9 has high accuracy/high confidence location than other vehicles in communication with vehicle A 980, such as vehicle B 990 of FIG. 9 may use GNSS information for a highly accurate relative location and the highly accurate location from vehicle A 980 sent to vehicle B 990 to determine a highly accurate location for vehicle B 990, even if the systems of vehicle B 990 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 950 is accurate, the ability to propagate highly accurate location data from vehicle A 980 to surrounding vehicles such as vehicle B 990 enables the surrounding vehicles to also accurately determine their relative location versus the map data, even in otherwise troublesome signal/location environments. Vehicle information server 955 may provide vehicle information such as size, shape, and antenna location which may be utilized, for example, by vehicle A or other vehicles to determine not just the relative location between the GNSS receiver on vehicle A 980 and, for example, vehicle B 990, but also the distance between the closest points of Vehicle A 980 and Vehicle B 990. In an embodiment, traffic information from the traffic control and optimization server 965 may be utilized to determine overall path selection and rerouting, used in conjunction with route server 945 (in an embodiment). In an embodiment, environmental data server 940 may provide input on road conditions, black ice, snow, water on the road and other environmental conditions which may also impact the decisions and decision criteria in inter-vehicle maneuver coordination block 1024 and maneuver execution block 1026. For example, in icy or rainy conditions, the vehicle 1000 may execute and/or request increased inter-vehicle distance from adjacent vehicles or may choose route options that avoid road hazard conditions such as black ice and standing water.

Block 1028 may be implemented using various dedicated or generalized hardware and software, such as using processor 1010 (an example of processor(s) 1110 or DSP 1120 of FIG. 11) and memory 1160 (again, as shown in FIG. 11) or, in an embodiment, in specialized hardware blocks such as dedicated sensor processing and/or vehicle messaging cores. According to some embodiments, the location of nearby vehicles may be determined through various means such as based on signal-based timing measurements such as Round-Trip Time (RTT) and Time Of Arrival (TOA), signal strength of a broadcast signal for vehicles, and a distance determined based upon broadcast latitude and longitude from a neighboring vehicle and the current location of the vehicle. Additionally or alternatively, location of nearby vehicles may be determined from sensor measurements such as 5G New Radio (NR), Ultra wide band (UWB), Light Detection and Ranging (LIDAR), Radio Detection And Ranging (RADAR), SONAR, camera measurements, or any combination thereof. In an embodiment, some or all of blocks 1002, 1004, 1006, 1008 and/or 1010 may have dedicated processing cores, for example, to improve performance and reduce measurement latency. In an embodiment, some or all of blocks 1002, 1004, 1006, 1008 and/or 1010 may share processing with block 1028.

Vehicle external sensors 602 may comprise, in some embodiments, cameras, LIDAR, RADAR, proximity sensors, other sensors (e.g., devices for detecting weather, rain, snow, pressure changes, vertical directionality, ground position, proximity detection, etc.), GNSS receivers 770 and received data used with the sensors such as map data, environmental data, location, route and/or other vehicle information such as may be received from other vehicles, devices and servers such as, in an embodiment, map server 950, route server 945, vehicle information server 955, environmental data server 940, location server 960, and/or from associated devices such as mobile device 902, which may be present in or near to the vehicle such as vehicle A 980. For example, in an embodiment, mobile device 902 may provide an additional source of GNSS measurements, may provide an additional source of motion sensor measurements, or may provide network access as a communication portal to a WAN, Wi-Fi or other network, and as a gateway to various information servers such as servers 940, 945, 950, 955, 960, 965, and/or 968.

Figure 12:
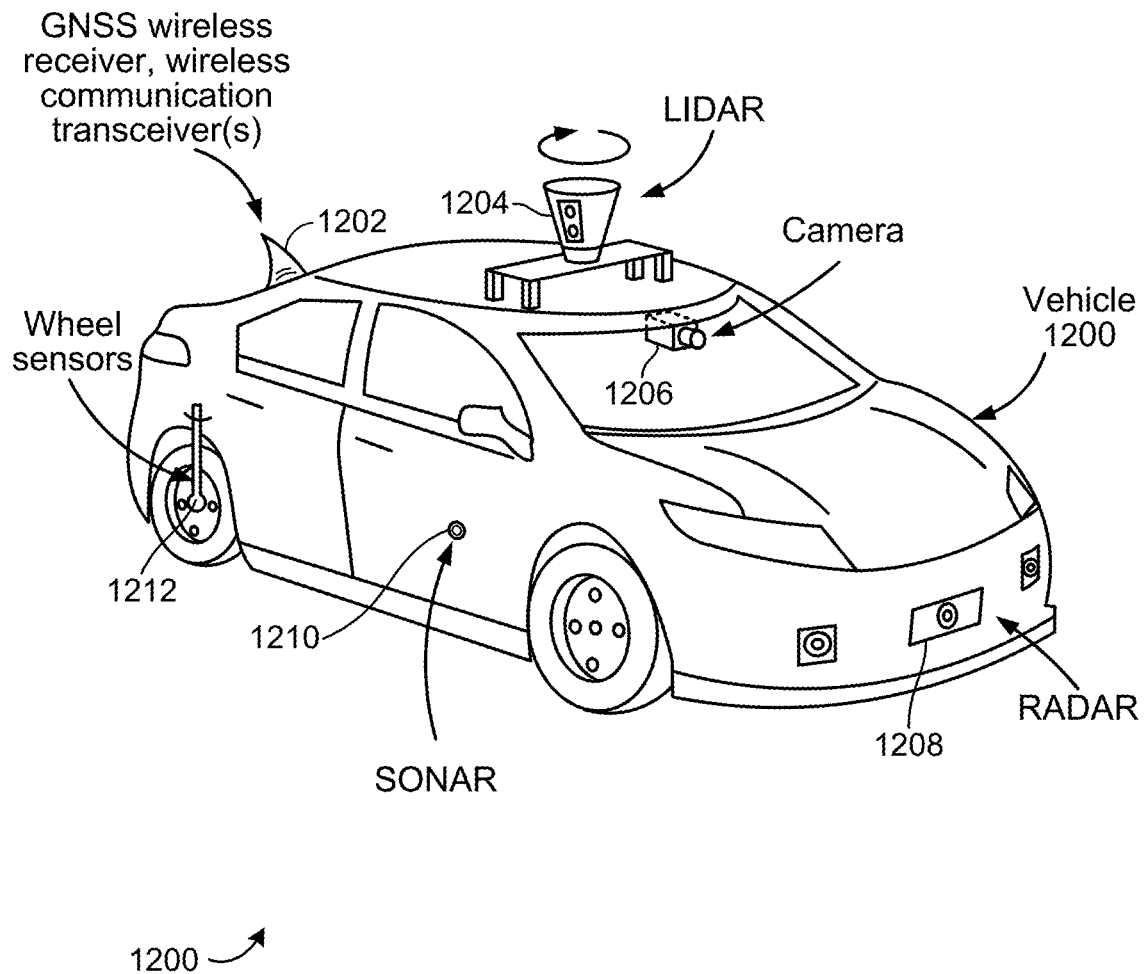
FIG. 12 is a perspective view of an example vehicle, according to an embodiment.

It is understood that the vehicle 1000 may contain one or a plurality of cameras. In an embodiment, a camera may be front facing, side facing, rear facing or adjustable in view (such as a rotatable camera). As shown in FIG. 12, for example, there may be multiple cameras facing the same plane. For example, the cameras 1206 may be one of two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1204 may be roof mounted and rotating or may be focused on a particular point of view (such as front facing, rear facing, side facing). LIDAR 1204 may be solid state or mechanical. Proximity sensors may be ultrasonic, RADAR-based, light-based (such as based on infrared range finding), and/or capacitive (surface touch oriented or capacitive detection of metallic bodies). Other sensors may include various sensing capabilities and technologies such as barometric pressure sensors, devices for detecting weather, pressure changes, vertical directionality, ground position, proximity detection, moisture detectors, rain and/or snow sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 1004 may comprise wheel sensors 812 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 1004 and vehicle external sensors 1002 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 1028 to determine vehicle location. The car status values derived from measurements from internal and external sensors may be further combined with car status values and/or measurements from other sensor systems using a general or applications processor. For example, blocks 1028 and/or 1024 or may be implemented on a dedicated or a centralized processor to determine data element values for V2X messaging which may be sent utilizing wireless transceiver(s) 1130 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 1130 and antenna(s) 1132.

In an embodiment, vehicle capabilities 1006 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive trains may share performance estimates for drive-performance related estimates such as breaking/stopping distance, turning radius, and acceleration performance. Vehicle performance estimates may also be obtained, for example, using external V2X input(s) 1008, over a wireless network from vehicular data servers on the network. This is particularly helpful to obtain information for vehicles that are not wireless capable and cannot provide vehicular information directly. In an embodiment, vehicle capabilities 1006 may also be influenced by car component status such as tire wear, tire brand capabilities, brake pad wear, brake brand and capabilities, and engine status. In an embodiment, vehicle capabilities 1006 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 1002 and/or vehicle internal sensors 1004, may be weighted more heavily and/or given preference in determining capability.

V2X vehicle sensing, prediction, planning execution 1012 handles the receipt and processing of information from blocks 1002, 1004, 1006, 1008 and 1010, via external object sensing and classification block 1014, in part utilizing sensor fusion and object classification block 1016 to correlate, corroborate and/or combine data from input blocks 1002, 1004, 1006, 1008 and 1010. Block 1014 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 1014 may utilize GNSS measurement messages from other vehicles to determine the relative positioning to other vehicles. This output from block 1014 may be provided to prediction and planning block 1018, which determines detected objects and vehicles and their associated trajectory via block 1020 and determines vehicle maneuver and path planning in block 1022, the outputs of which are utilized in block 1026 vehicle maneuver execution either directly or via V2X inter-vehicle negotiation block 1024, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 11 comprises a functional block diagram of a vehicle 1100, according to an embodiment. The vehicle 1100 may comprise for example, a car, bus, truck, motorcycle and/or other motorized vehicle that may, at least in part, be driven autonomously. Vehicle 1100 may be an example of a legacy vehicle and/or of a V2X capable vehicle. As a legacy vehicle, the vehicle 1100 may lack the ability to communicate via a V2X network and/or may lack a suitable combination of vehicle sensor(s) 1145, vehicle motion sensor(s) 1140, LIDAR 1150, RADAR 1153, GNSS receiver 1170, camera(s) 1135, or ADAS capabilities that may be considered a minimum requirement for participation in a V2X network.

As shown in FIG. 11, vehicle 1100 may include a variety of software and hardware components connected via bus 1101. For example, the vehicle 1100 may include one or more processor(s) 1110 and memory 1160. Memory 1160 may include executable instructions, executable by the processor(s) 1110, to perform autonomous driving activities including, but not limited to, external object sensing and classification, prediction and planning, maneuver execution, receiving and/or transmitting V2X messages (including in some instances some combination of vehicle capabilities and/or occupant metadata). In some embodiments, memory 1160 may include vehicle processing module 1165. Vehicle processing module 1165 may correspond to code that, when executed by the processor(s) 1110, cause the processor(s) 1110 to generate and/or present (e.g., via input/output device(s) 1168 or output device(s) 1315 of FIG. 13) any suitable driver assistance information based at least in part on data elements received in one or more V2X data messages. Vehicle processing module 1165 may include code that, when executed by the processor(s) 1110, cause the processor(s) 1110 to perform any suitable operation for obtaining, soliciting, storing, receiving, transmitting, comparing, or otherwise interaction with any suitable vehicle capabilities and/or occupant metadata. The vehicle processing module 1165 may provide any suitable graphical and/or audible interface with which any suitable combination of vehicle capabilities and/or occupant metadata may be obtained. In general, any functionality described as being provided by a V2X capable vehicle may be performed by executing code of the vehicle processing module 1165.

Vehicle 1100 may include one or more wireless transceivers, such as wireless transceiver(s) 1130, for transmitting and receiving data via various means, protocols and standards, such as via SAE or European Telecommunications Standards Institute (ETSI) CV2X messages and data elements or other wireless and wireless protocols. In some embodiments, the wireless transceiver(s) 1130 may be configured to transmit and receive data messages and elements via a short-range wireless communications protocol (e.g., Bluetooth®, Bluetooth Low Energy®, etc.), and/or via a local and/or wide area network, and/or via a cellular network, and/or via any suitable wireless network. Of course, it should be understood that these are merely examples of networks that may be utilized by the vehicle 1100 over a wireless link, and claimed subject matter is not limited in this respect. In an embodiment, wireless transceiver(s) 1130 may comprise various combinations of WAN, WLAN, and/or PAN transceivers. In an embodiment, wireless transceiver(s) 1130 may also comprise a Bluetooth transceiver, a ZigBee transceiver, or other PAN transceiver.

In some embodiments, the vehicle 1100 may include a Global Navigation Satellite System (GNSS) receiver 1170. The GNSS receiver 1170 may be configured to receive and digitally process signals from a navigation satellite (and/or other vehicles) in order to provide position, velocity, and time of the receiver. The GNSS receiver 1170 may include hardware and/or software components. In an embodiment, GNSS signals from GNSS Satellites received by the GNSS receiver 1170 are utilized by vehicle 1100 for location determination and/or for the determination of GNSS signal parameters and demodulated data. In an embodiment, signals received by wireless transceiver(s) 1130 are used for location determination, alone or in combination with GNSS signals received by the GNSS receiver 1170.

Examples of network technologies that may support wireless transceiver(s) 1130 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the $3^{rd}$ Generation Partnership Project II (3GPP2). WCDMA is also part of the Universal Mobile Telecommunications System (UMTS) and may be supported by an HNB.

Wireless transceiver(s) 1130 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an embodiment, further wireless base stations may comprise a WLAN and/or PAN transceiver.

In an embodiment, vehicle 1100 may contain one or more camera(s) 1135. In an embodiment, the camera(s) 1135 may comprise a camera sensor and mounting assembly. Different mounting assemblies may be used for different cameras on vehicle 1100. For example, front facing cameras may be mounted in the front bumper, in the stem of the rear-view mirror assembly or in other front facing areas of the vehicle 1100. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

In some embodiments, at least some of camera(s) 1135 may be inward facing. The camera(s) 1135 may be utilized to capture one or more images from which vehicle data may be derived (e.g., an image of the speedometer from which speed can be derived, an image of a heading indicator from which a heading may be derived, etc.). In some embodiments, camera(s) 1135 may be utilized to capture one or more images of at least some portion of one or more of the vehicle occupants.

Vehicle motion sensor(s) 1140 may include any suitable number of accelerometers, gyros, and/or magnetometers. In some embodiments, the vehicle motion sensor(s) 1140 may be part of an inertial measurement unit of the vehicle 1100. The vehicle motion sensor(s) 1140 may be utilized to provide and/or verify motion and directional information, to monitor wheel and drive train performance, and/or to measure amplitude and frequency of oscillations of the vehicle 1100 and/or parts of the vehicle 1100. By way of example, an accelerometer (e.g., a 3-axis accelerometer) can measure vibrations of the vehicle 1100 such as movement or mechanical oscillation about an equilibrium position of a component of the vehicle 1100. Accelerometers, in an embodiment, may also be utilized to verify actual time of impact with road hazards such as pot holes relative to predicted times based on existing stopping and acceleration models as well as steering models. Gyros and magnetometers of the vehicle sensor(s) 1145 may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors such as speed sensors, wheel tick sensors, and/or odometer measurements. In some embodiments, vehicle sensor(s) 745 may be configured to measure oscillations and/or oscillation frequency corresponding to motions performed by the vehicle 1100.

The vehicle 1100 may include LIDAR 1150. LIDAR 1150 may use pulsed laser light to measure ranges to objects. While camera(s) 1135 can provide object detection, LIDAR 1150 may provide a means to detect the distances (and orientations) of the objects with more certainty, especially in regard to objects of unknown size and shape. LIDAR 1150 measurements may also be used to estimate rate of travel, vector directions, relative position and stopping distance by providing accurate distance measurements and delta distance measurements.

In an embodiment, power and drive systems and related systems 1175 (generator, battery, transmission, engine) and systems 1155 (brake, actuator, throttle control, steering, and electrical) may be controlled by the processor(s) 1110 and/or hardware or software or by an operator of the vehicle or by some combination thereof. The systems 1155 and power and drive systems and related systems 1175 may be utilized in conjunction with performance parameters and operational parameters, to enable autonomously (and manually, relative to alerts and emergency overrides/braking/stopping) driving and operating a vehicle 1100 safely and accurately, such as to safely, effectively and efficiently merge into traffic, stop, accelerate and otherwise operate the vehicle 1100. In an embodiment, input from the various sensor systems such as camera(s) 1135, vehicle motion sensor(s) 1140 (including accelerometers, gyros, manometers, etc.), LIDAR 1150, GNSS receiver 1170, RADAR 1153, input, messaging and/or measurements from wireless transceiver(s) 1130 or various combinations thereof, may be utilized by processor(s) 1110 and/or DSP 1120 or other processing systems to control power and drive systems and related systems 1175 and systems 1155.

GNSS receiver 1170 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 1170, may receive RF signals from one or more GNSS satellites using one or more antenna(s) 1172. The GNSS receiver 1170 may support one or more GNSS constellations as well as other satellite-based navigation systems. For example, in an embodiment, GNSS receiver 1170 may support global navigation satellite systems such as GPS, the GLONASS, Galileo, and/or BeiDou, or any combination thereof. In an embodiment, GNSS receiver 1170 may support regional navigation satellite systems such as NavIC or QZSS or a combination thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver 1170 and antenna(s) 1172 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 1170 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudo-range measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from road-side units (RSUs), to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an road-side unit (RSU) equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 1153, uses transmitted radio waves that are reflected off of objects. The reflected radio waves are analyzed, based on the time taken for reflections to arrive and other signal characteristics of the reflected waves to determine the location of nearby objects. RADAR 1153 may be utilized to detect the location of nearby cars, roadside objects (signs, other vehicles, pedestrians, etc.) and will generally enable detection of objects even if there is obscuring weather such as snow, rail or hail. Thus, RADAR 1153 may be used to complement LIDAR 1150 and camera(s) 1135 in providing ranging information to other objects by providing ranging and distance measurements and information when visual-based systems typically fail. Furthermore, RADAR 1153 may be utilized to calibrate and/or sanity check other systems such as LIDAR 1150 and camera(s) 1135. Ranging measurements from RADAR 1153 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

Input/output device(s) 1168 may include any suitable one or more audio devices (e.g., one or more speakers) and/or one or more display(s) (e.g., a dashboard display, a media display, a projected display, and the like). The input/output device(s) 1168 may provide an interface through which a mobile device (e.g., mobile device 902 of FIG. 9) can provide data for presentation at vehicle 1100 (e.g., in scenarios in which mobile device 902 is acting as proxy for the vehicle 1100.

FIG. 12 is a perspective view of an example vehicle 1200 (e.g., an example of the vehicle 1100 of FIG. 11, an example of the vehicle 104 of FIGS. 1-4), according to an embodiment. Here, some of the components discussed with regard to FIG. 12 and earlier embodiments are shown. As illustrated and previously discussed, the vehicle 1200 can have one or more camera(s) (e.g., each an example of camera(s) 1135 of FIG. 11) such as a rear view mirror-mounted camera 1206, a passenger facing camera (not shown), front fender-mounted camera (not shown), side mirror-mounted camera (not shown) and a rear camera (not shown, but typically on the trunk, hatch or rear bumper). Vehicle 1200 may also have LIDAR 1204 (an example of the LIDAR 1150 of FIG. 11), for detecting objects and measuring distances to those objects; LIDAR 1104 is often roof-mounted, however, if there are multiple LIDAR units, they may be oriented around the front, rear and sides of the vehicle. Vehicle 1200 may have other various location-related systems such as a receiver 1202 such as a GNSS wireless receiver (typically located in the shark fin unit on the rear of the roof, as indicated) and/or various wireless transceivers (such as WAN, WLAN, V2X; typically, but not necessarily, located in the shark fin), RADAR 1208 (typically in the front bumper), and SONAR 1210 (typically located on both sides of the vehicle, if present. Wheel sensors 1212 (an example of vehicle motion sensor(s) 1140 of FIG. 11) may also be present and may include wheel sensors and/or drive train sensors such as tire pressure sensors, accelerometers, gyros, and wheel rotation detection and/or counters.

In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. By way of example, the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 12 is intended to provide exemplary locations of various sensors in an embodiment of vehicle 1200.

It should be appreciated that any suitable sensor and/or any suitable device/component depicted in FIG. 12 may be installed after market. Thus, any of the sensors/devices/components depicted in FIG. 12 may be an example of a third-party sensor (e.g., of the third-party sensor(s) 105 of FIG. 1).

FIG. 13 is a block diagram of an embodiment of a proxy device 1300, in accordance with at least one embodiment. According to some embodiments, the proxy device 1300 may comprise a stand-alone device mobile device (e.g. a smartphone, a laptop, a tablet PC, etc.), which may be communicatively coupled with other components/devices of the vehicle or RSU. It also can be noted that the proxy device 1300 may be utilized in the similar manner by V2X entities other than a vehicle or RSU. Additionally, embodiments may not necessarily be limited to V2X communications. As such, alternative embodiments may include a device similar to the proxy device 1300, having similar components to those shown in FIG. 13 and capable of performing the functions of the vehicles and/or RSU described in the previously-discussed embodiments, but without V2X functionality.

It should also be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be located, for example, at different physical locations on a vehicle, RSU, or other V2X entity.

The proxy device 1300 is shown comprising hardware elements that can be electrically coupled via a bus 1305 (or may otherwise be in communication, as appropriate). The hardware elements may include a processor(s) 1310 which can include without limitation one or more general-purpose processors, one or more special-purpose processors (such as digital signal processing (DSP) chips (e.g., DSP 1320), graphics acceleration processors, application-specific integrated circuits (ASICs), and/or the like), and/or other processing structure or means.

The proxy device 1300 also can include one or more input device(s) 1370, which can include devices related to user interface (e.g., a touch screen, touchpad, microphone, button(s), dial(s), switch(es), and/or the like). Similarly, the one or more output device(s) 1315 may be related to interacting with a user (e.g., via a display, light emitting diode(s) (LED(s)), speaker(s), etc.). For example, the one or more output device(s) 1315 may be utilized by the proxy device 1300 to present (e.g., display, sound, etc.) the driver assistance information 122 of FIG. 1.

The proxy device 1300 may also include wireless transceiver(s) 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. The wireless transceiver(s) 1330 can enable the proxy device 1300 to communicate to other V2X devices (e.g., vehicle B 990, RSU(s) 925, servers 940, 945, 950, 955, 960, 965, and 968 of FIG. 9) and devices that lack V2X communication capabilities (e.g., vehicle A 980). This can include the various forms of communication of the previously-described embodiments. And as such, it may be capable of transmitting direct communications, broadcasting wireless signals, receiving direct and/or broadcast wireless signals, and so forth. Accordingly, the wireless transceiver(s) 1330 may be capable of sending and/or receiving RF signals from various RF channels/frequency bands. Communication using the wireless transceiver(s) 1330 can be carried out via one or more wireless communication antenna(s) 1332 that send and/or receive wireless signals 1334.

The proxy device 1300 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensor(s) 1340 may be used, for example, to determine certain real-time characteristics of the vehicle, such as location, velocity, acceleration, and the like. As previously indicated, sensor(s) 1340 may be used to help a vehicle determine its location.

Embodiments of the proxy device 1300 may also include a GNSS receiver 1380 capable of receiving signals 1384 from one or more GNSS satellites using an antenna 1382 (which, in some embodiments, may be the same as wireless communication antenna(s) 1332). Positioning based on GNSS signal measurement can be utilized to determine a current location of the proxy device 1300, and may further be used as a basis to determine the location of a detected object. The GNSS receiver 1380 can extract a position of the proxy device 1300, using conventional techniques, from GNSS satellites of a GNSS system, such as Global Positioning System (GPS) and/or similar satellite systems.

The proxy device 1300 may further comprise and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the proxy device 1300 also can comprise software elements (some of which are not shown in FIG. 13) including an operating system, device drivers, executable libraries, and/or other code, such as one or more application programs, which may comprise computer programs provided by various embodiments, and/or may be designed to implement methods and/or configure systems as described herein. Software applications (e.g., the proxy processing module 1365) stored in memory 1360 and executed by processor(s) 1310 may be used to implement the functionality providing the functionality of proxy devices as described herein. Moreover, one or more procedures described with respect to the method(s) discussed herein may be implemented as part of the proxy processing module 1365 and stored in memory 1360. The code/instructions of proxy processing module 1365 are executable by the proxy device 1300 (and/or processor(s) 1310 or DSP 1320 within proxy device 1300) and may include the functions described above in connection with functions of the proxy device(s) of FIGS. 1-8. In an aspect, then, such code and/or instructions can be used to configure and/or adapt a general-purpose computer (or other device) to perform one or more operations in accordance with the described methods.

The proxy processing module 1365 may include code that, when executed by the processor(s) 1310, cause the processor(s) 1310 to perform any suitable operation for obtaining, soliciting, storing, receiving, transmitting, comparing, or otherwise interaction with any suitable vehicle capabilities and/or occupant metadata. The proxy processing module 1365 may provide any suitable graphical and/or audible interface with which any suitable combination of vehicle capabilities and/or occupant metadata may be obtained (e.g., from a user of the proxy device 1300). The proxy processing module 1365 may include one or more application programming interface with which occupant metadata may be obtained and/or provided by one or more user devices associated with one or more occupants of the vehicle.

Processor(s) 1310 may receive and/or transmit location, vehicle capabilities and/or occupant metadata of vehicle A 980, status, GNSS and other sensor measurements, one or more trust values corresponding to sensor measurements, capability information from vehicle A 980 and/or vehicle B 990 such as GNSS measurements, sensor measurements, velocity, heading, location, stopping distance, priority or emergency status and other vehicle-related information, and the like. In an embodiment, environmental information such as road surface information/status, weather status, and camera information may be gathered and shared with vehicles, either via point to point or broadcast messaging (e.g., from RSU(s) 925, vehicle A 980, vehicle B 990, or any suitable combination of the servers of FIG. 9). Processor(s) 1310 may utilize the received information to coordinate and direct traffic flow and to provide environmental, vehicular, safety and announcement messages to vehicle A 980, which would otherwise not be able to ascertain such information. By utilizing the proxy device 1300, a legacy vehicle can participate in a V2X environment such that information provided by other V2X entities can be presented to the driver of the legacy vehicle.

Processor 925A may be configured to operate a network interface 925B, in an embodiment, which may be connected via a backhaul to network 970, and which may be used, in an embodiment, to communicate and coordinate with various centralized servers such as a centralized traffic control and optimization server 965 that monitors and optimizes the flow of traffic in an area such as within a city or a section of a city or in a region. Network interface 925B may also be utilized for remote access to RSU(s) 925 for crowd sourcing of vehicle data, maintenance of the RSU(s) 925, and/or coordination with other RSU(s) 925 or other uses. RSU(s) 925 may have a processor 925A configured to operate traffic control unit 925C which may be configured to process data received from vehicles such as vehicle A 980 and vehicle B 990 such as location data, stopping distance data, road condition data, identification data and other information related to the status and location of nearby vehicles and environment. RSU(s) 925 may have a processor 925A configured to obtain data from environmental and roadside sensors 925D, which may include temperature, weather, camera, pressure sensors, road sensors (for car detection, for example), accident detection, movement detection, speed detection and other vehicle and environmental monitoring sensors.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 1360 of FIG. 13) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method for transmitting data by a mobile device on behalf of a vehicle, comprising:

obtaining, by the mobile device, vehicle capabilities associated with the vehicle, the vehicle capabilities indicating one or more sensors of the vehicle;

determining, by the mobile device, mobile device capabilities indicating one or more sensors, processing resources, or both of the mobile device;

obtaining, by the mobile device from a credential authority, one or more transmission credentials for vehicle-to-everything transmissions based at least in part on the vehicle capabilities and the mobile device capabilities, wherein the obtaining the one or more transmission credentials comprises transmitting, to the credential authority, the vehicle capabilities, the mobile device capabilities, and a public key generated by the mobile device;

in response to obtaining the one or more transmission credentials for vehicle-to-everything transmissions, transmitting, by the mobile device via one or more transceivers, one or more data messages on behalf of the vehicle utilizing the one or more transmission credentials; and providing at least one transmission credential to a sensor device, wherein providing the at least one transmission credential to the sensor device configures the sensor device to transmit data via the network.

2. The method of claim 1, wherein a transmission credential of the one or more transmission credentials comprises the public key generated by the mobile device as encrypted with a private key associated with the credential authority.

3. The method of claim 2, wherein transmitting the one or more data messages comprises:
obtaining data from at least one of a sensor of the mobile device, the vehicle, or a sensor of the vehicle;
encrypting the data to generate encrypted data, wherein encrypting the data utilizes a private key associated with the public key generated by the mobile device; and
generating, by the mobile device, a digital signature for the one or more data messages using the private key associated with the public key generated by the mobile device, wherein the one or more data messages, as transmitted, comprises the encrypted data, the digital signature, and the transmission credential.

4. The method of claim 1, wherein a transmission credential of the one or more transmission credentials is generated by the credential authority based at least in part on determining that the vehicle capabilities and the mobile device capabilities meet a set of transmission threshold requirements.

5. The method of claim 1, wherein a transmission credential of the one or more transmission credentials is associated with one or more particular types of data for which transmission authority is granted to the mobile device, and wherein the mobile device is configured to restrict transmitted data to data of the one or more particular types.

6. The method of claim 1, wherein the one or more data messages are formatted according to a vehicle-to-everything communications protocol.

7. The method of claim 1, further comprising:
obtaining, by the mobile device, a reception credential from the credential authority;
receiving, by the mobile device, a data message based at least in part on obtaining the reception credential; and
executing, by the mobile device, one or more operations based at least in part on the data message as received.

8. The method of claim 7, wherein executing the one or more operations comprises:
generating driving assistance information based at least in part on the data message as received,
providing the driving assistance information to an output device associated with the mobile device or the vehicle,
determining a data element of the data message comprises additional vehicle capabilities corresponding to the vehicle,
storing, at the mobile device, the additional vehicle capabilities received from the data message,
transmitting at least a portion of the additional vehicle capabilities in one or more data messages,
determining whether to adjust a trust value associated with a sensor based at least in part on the data message as received;
or any combination thereof.

9. A mobile device comprising:
a memory; and
one or more processors communicatively coupled with the memory, the one or more processors being configured to:
obtain vehicle capabilities associated with the vehicle, the vehicle capabilities indicating one or more sensors of the vehicle;
determine mobile device capabilities indicating one or more sensors, processing resources, or both of the mobile device;
obtain, from a credential authority, one or more transmission credentials for vehicle-to-everything transmissions based at least in part on the vehicle capabilities and the mobile device capabilities, wherein the obtaining the one or more transmission credentials comprises transmitting, to the credential authority, the vehicle capabilities, the mobile device capabilities, and a public key generated by the mobile device;
in response to obtaining the one or more transmission credentials for vehicle-to-everything transmissions, transmit, via one or more transceivers, one or more data messages on behalf of the vehicle utilizing the one or more transmission credentials; and
provide at least one transmission credential to a sensor device, wherein providing the at least one transmission credential to the sensor device configures the sensor device to transmit data via the network.

10. The mobile device of claim 9, wherein a transmission credential of the one or more transmission credentials comprises the public key generated by the mobile device as encrypted with a private key associated with the credential authority.

11. The mobile device of claim 10, wherein transmitting the one or more data messages causes the one or more processors to:
obtain data from at least one of a sensor of the mobile device, the vehicle, or a sensor of the vehicle;
encrypt the data to generate encrypted data, wherein encrypting the data utilizes a private key associated with the public key generated by the mobile device; and
generate a digital signature for the one or more data messages using the private key associated with the public key generated by the mobile device, wherein the one or more data messages, as transmitted, comprises the encrypted data, the digital signature, and the transmission credential.

12. The mobile device of claim 9, wherein a transmission credential of the one or more transmission credentials is generated by the credential authority based at least in part on determining that the vehicle capabilities and the mobile device capabilities meet a set of transmission threshold requirements.

13. The mobile device of claim 9, wherein a transmission credential of the one or more transmission credentials is associated with one or more particular types of data for which transmission authority is granted to the mobile device, and wherein the mobile device is configured to restrict transmitted data to data of the one or more particular types.

14. The mobile device of claim 9, wherein the one or more data messages are formatted according to a vehicle-to-everything communications protocol.

15. The mobile device of claim 9, wherein the one or more processors are further configured to:
obtain a reception credential from the credential authority;
receive a data message based at least in part on obtaining the reception credential; and
execute one or more operations based at least in part on the data message as received.

16. The mobile device of claim 15, wherein executing the one or more operations further causes the one or more processors to:
generate driving assistance information based at least in part on the data message as received,
provide the driving assistance information to an output device associated with the mobile device or the vehicle,
determine a data element of the data message comprises additional vehicle capabilities corresponding to the vehicle,
store, at the mobile device, the additional vehicle capabilities received from the data message,
transmit at least a portion of the additional vehicle capabilities in one or more data messages,
determine whether to adjust a trust value associated with a sensor based at least in part on the data message as received;
or any combination thereof.

17. A non-transitory computer-readable medium having instructions stored for transmitting data by a mobile device on behalf of a vehicle, wherein the instructions, when executed by one or more processors of the mobile device, cause the one or more processors to:
obtain vehicle capabilities associated with the vehicle, the vehicle capabilities indicating one or more sensors of the vehicle;
determine mobile device capabilities indicating one or more sensors, processing resources, or both of the mobile device;
obtain, from a credential authority, one or more transmission credentials for vehicle-to-everything transmissions based at least in part on the vehicle capabilities and the mobile device capabilities, wherein the obtaining the one or more transmission credentials comprises transmitting, to the credential authority, the vehicle capabilities, the mobile device capabilities, and a public key generated by the mobile device;
in response to obtaining the one or more transmission credentials for vehicle-to-everything transmissions, transmit, via one or more transceivers of the mobile device, one or more data messages on behalf of the vehicle utilizing the one or more transmission credentials; and
provide at least one transmission credential to a sensor device, wherein providing the at least one transmission credential to the sensor device configures the sensor device to transmit data via the network.

18. The non-transitory computer-readable medium of claim 17, wherein transmitting the one or more data messages causes the one or more processors to:
obtain data from at least one of a sensor of the mobile device, the vehicle, or a sensor of the vehicle;
encrypt the data to generate encrypted data, wherein encrypting the data utilizes a private key associated with the public key generated by the mobile device; and
generate a digital signature for the one or more data messages using the private key associated with the public key generated by the mobile device, wherein the one or more data messages, as transmitted, comprises the encrypted data, the digital signature, and the transmission credential.

19. The non-transitory computer-readable medium of claim 17, wherein a transmission credential of the one or more transmission credentials is associated with one or more particular types of data for which transmission authority is granted to the mobile device, and wherein the mobile device is configured to restrict transmitted data to data of the one or more particular types.

20. The non-transitory computer-readable medium of claim 17, wherein the one or more processors are further configured to:
obtain a reception credential from the credential authority;
receive a data message based at least in part on obtaining the reception credential; and
execute one or more operations based at least in part on the data message as received.

21. The non-transitory computer-readable medium of claim 20, wherein executing the one or more operations further causes the one or more processors to:
generate driving assistance information based at least in part on the data message as received,
provide the driving assistance information to an output device associated with the mobile device or the vehicle,
determine a data element of the data message comprises additional vehicle capabilities corresponding to the vehicle,
store, at the mobile device, the additional vehicle capabilities received from the data message,
transmit at least a portion of the additional vehicle capabilities in one or more data messages,
determine whether to adjust a trust value associated with a sensor based at least in part on the data message as received;
or any combination thereof.

22. A mobile device comprising:
means for obtaining vehicle capabilities associated with the vehicle, the vehicle capabilities indicating one or more sensors of the vehicle;
means for determining mobile device capabilities indicating one or more sensors, processing resources, or both of the mobile device;
means for obtaining, from a credential authority, one or more transmission credentials for vehicle-to-everything transmissions based at least in part on the vehicle capabilities and the mobile device capabilities, wherein the obtaining the one or more transmission credentials comprises transmitting, to the credential authority, the vehicle capabilities, the mobile device capabilities, and a public key generated by the mobile device;
means for transmitting, via the network in response to obtaining the one or more transmission credentials, one or more data messages to at least one other vehicle on behalf of the vehicle utilizing the one or more transmission credentials; and
means for providing at least one transmission credential to a sensor device, wherein providing the at least one transmission credential to the sensor device configures the sensor device to transmit data via the network.

23. The mobile device of claim 22, wherein the means for transmitting the one or more data messages further comprises:
means for obtaining data from at least one of a sensor of the mobile device, the vehicle, or a sensor of the vehicle;

means for encrypting the data to generate encrypted data, wherein encrypting the data utilizes a private key associated with the public key generated by the mobile device; and means for generating a digital signature for the one or more data messages using the private key associated with the public key generated by the mobile device, wherein the one or more data messages, as transmitted, comprises the encrypted data, the digital signature, and the transmission credential.

24. The mobile device of claim 22, wherein a transmission credential of the one or more transmission credentials is associated with one or more particular types of data for which transmission authority is granted to the mobile device, and wherein the mobile device is configured to restrict transmitted data to data of the one or more particular types.

25. The mobile device of claim 22, further comprising:
means for obtaining a reception credential from the credential authority;
means for receiving a data message based at least in part on obtaining the reception credential; and
means for executing one or more operations based at least in part on the data message as received.

26. The mobile device of claim 22, wherein the means for executing one or more operations further comprises:
means for generating driving assistance information based at least in part on the data message as received,
means for providing the driving assistance information to an output device associated with the mobile device or the vehicle,
means for determining a data element of the data message comprises additional vehicle capabilities corresponding to the vehicle,
means for storing, at the mobile device, the additional vehicle capabilities received from the data message,
means for transmitting at least a portion of the additional vehicle capabilities in one or more data messages,
means for determining whether to adjust a trust value associated with a sensor based at least in part on the data message as received;
or any combination thereof.

* * * * *